United States Patent
Wakamiya

(10) Patent No.: US 8,237,842 B2
(45) Date of Patent: Aug. 7, 2012

(54) WIDE-ANGLE LENS AND IMAGING APPARATUS EQUIPPED THEREWITH

(75) Inventor: Koichi Wakamiya, Tokyo (JP)

(73) Assignee: Nikon Corporation, Tokyo (JP)

( * ) Notice: Subject to any disclaimer, the term of this patent is extended or adjusted under 35 U.S.C. 154(b) by 360 days.

(21) Appl. No.: 12/672,032

(22) PCT Filed: Aug. 1, 2008

(86) PCT No.: PCT/JP2008/064262
§ 371 (c)(1),
(2), (4) Date: Feb. 3, 2010

(87) PCT Pub. No.: WO2009/020195
PCT Pub. Date: Feb. 12, 2009

(65) Prior Publication Data
US 2011/0037828 A1    Feb. 17, 2011

(30) Foreign Application Priority Data
Aug. 7, 2007  (JP) ................. 2007-205543

(51) Int. Cl.
*G02B 13/16*  (2006.01)
*G02B 13/04*  (2006.01)
*H04N 5/225*  (2006.01)

(52) U.S. Cl. .......... 348/335; 359/749
(58) Field of Classification Search .......... None
See application file for complete search history.

(56) References Cited

U.S. PATENT DOCUMENTS

| | | | | |
|---|---|---|---|---|
| 5,805,359 A * | 9/1998 | Yamanashi | ............ | 359/753 |
| 6,937,402 B2 * | 8/2005 | Miyauchi | ............ | 359/686 |
| 7,061,686 B2 * | 6/2006 | Ohtake | ............ | 359/687 |
| 7,280,283 B1 * | 10/2007 | Kasai | ............ | 359/656 |
| 7,286,302 B2 * | 10/2007 | Ohzawa et al. | ............ | 359/749 |
| 7,301,578 B2 * | 11/2007 | Ohzawa et al. | ............ | 348/340 |
| 7,567,288 B2 * | 7/2009 | Mihara et al. | ............ | 348/345 |
| 7,593,167 B2 * | 9/2009 | Katakura | ............ | 359/682 |
| 7,701,649 B2 * | 4/2010 | Huang et al. | ............ | 359/754 |
| 7,843,652 B2 * | 11/2010 | Asami et al. | ............ | 359/753 |
| 7,869,141 B2 * | 1/2011 | Ning | ............ | 359/753 |
| 7,929,221 B2 * | 4/2011 | Ning | ............ | 359/753 |
| 7,995,291 B2 * | 8/2011 | Yamamoto | ............ | 359/770 |
| 2003/0002172 A1 * | 1/2003 | Ohtake et al. | ............ | 359/689 |
| 2003/0160902 A1 * | 8/2003 | Mihara et al. | ............ | 348/676 |

(Continued)

FOREIGN PATENT DOCUMENTS

JP    04-068307 A    3/1992

(Continued)

*Primary Examiner* — Jerry Dennison
(74) *Attorney, Agent, or Firm* — Miles & Stockbridge P.C.

(57) ABSTRACT

A wide-angle lens consists of, in order from an object, a front lens group GF consisting of a first front lens group GF1 that consists of a negative meniscus lens L11 having a concave surface facing an image, a second front lens group GF2 that consists of a negative lens L12 having a concave surface facing the image, and a third front lens group GF3 that has a convex surface facing the object and has positive refractive power; and a rear lens group GB consisting of a first rear lens group GB1 that consists of a cemented positive lens constructed by a negative lens L14 and a positive lens L15, and a second rear lens group GB2 having positive refractive power; thereby providing a wide-angle lens having a wide angle of view, well corrected aberrations, less ghost images capable of coping with wide luminance difference, and an imaging apparatus equipped therewith.

10 Claims, 20 Drawing Sheets

U.S. PATENT DOCUMENTS

| | | |
|---|---|---|
| 2004/0136086 A1* | 7/2004 | Ohtake .......................... 359/687 |
| 2005/0174463 A1* | 8/2005 | Ohzawa et al. ............... 348/335 |
| 2006/0110153 A1 | 5/2006 | Yanagida et al. |
| 2006/0274433 A1 | 12/2006 | Kamo |
| 2007/0206295 A1* | 9/2007 | Yamashita et al. ............ 359/717 |
| 2007/0263299 A1* | 11/2007 | Ohtake .......................... 359/774 |
| 2008/0094499 A1 | 4/2008 | Ueno et al. |
| 2008/0106799 A1* | 5/2008 | Ohashi .......................... 359/689 |
| 2011/0037828 A1* | 2/2011 | Wakamiya ..................... 348/36 |

FOREIGN PATENT DOCUMENTS

| | | |
|---|---|---|
| JP | 05-264897 A | 10/1993 |
| JP | 11-249009 A | 9/1999 |
| JP | 2000-352665 A | 12/2000 |
| JP | 2001-281540 A | 10/2001 |
| JP | 2002-072085 A | 3/2002 |
| JP | 2003-232998 A | 8/2003 |
| JP | 2004-029282 A | 1/2004 |
| JP | 2004-179881 A | 6/2004 |
| JP | 2004-317866 A | 11/2004 |
| JP | 2005-062694 A | 3/2005 |
| JP | 2005-195624 A | 7/2005 |
| JP | 2005-221920 A | 8/2005 |
| JP | 2006-011093 A | 1/2006 |
| JP | 2006-052975 A | 2/2006 |
| JP | 2006-119368 A | 5/2006 |
| JP | 2006-337690 A | 12/2006 |
| JP | 2007-158887 A | 6/2007 |
| JP | 2007-233152 A | 9/2007 |
| JP | 2008-040033 A | 2/2008 |
| JP | 2008-089997 A | 4/2008 |

\* cited by examiner

WIDE-ANGLE LENS AND IMAGING APPARATUS EQUIPPED THEREWITH

TECHNICAL FIELD

The present invention relates to a wide-angle lens and an imaging apparatus equipped therewith.

BACKGROUND ART

In an optical system for a surveillance purpose electronic imaging device, an optical system having extremely wide field of view and high resolving power has been required, for example, Japanese Patent Publication No. 2992547, and Japanese Patent Application Laid-Open Nos. 2002-72085, 2003-232998, 2004-29282, 2005-195624, and 2006-119368. A surveillance purpose lens specifically includes a general image-taking lens (a camera lens), a lens for securing safety of the inside and outside of a building, a lens for gathering image information inside or outside of a movable instrument such as a car, a lens for an eye of a robot, a lens for keeping security of an airplane, and a lens for celestial observation.

Those lenses used for such purposes are required to have a wide angle of view, high resolving power, and little ghost images capable of handling wider luminance difference, so that a wide-angle lens for such purposes has to have small number of air interfaces, simple lens configuration, and well-corrected aberrations.

DISCLOSURE OF THE INVENTION

The present invention is made in view of the aforementioned problems, and has an object to provide a wide-angle lens capable of accomplishing a wide angle of view, well-corrected aberrations, little ghost images capable of handling wider luminance difference, and an imaging apparatus equipped with the wide-angle lens.

According to a first aspect of the present invention, there is provided a wide-angle lens consisting of, in order from an object side: a front lens group consisting of a first front lens group that consists of a negative meniscus lens having a concave surface facing an image side, a second front lens group that consists of a negative lens having a concave surface facing the image side, and a third front lens group that has a convex surface facing the object side and has positive refractive power; and a rear lens group consisting of a first rear lens group that consists of a cemented lens constructed by, in order from the object side, a negative lens cemented with a positive lens and has positive refractive power as a whole, and a second rear lens group having positive refractive power; and the following conditional expression being satisfied:

$$3.50 < f6/f < 5.20$$

where f denotes a focal length of the wide-angle lens, and f6 denotes a focal length of the second rear lens group.

In the first aspect of the present invention, it is preferable that the following conditional expressions are preferably satisfied:

$$0.60 < f2/f1 < 1.95$$

$$-0.36 < f12/f6 < -0.21$$

$$1.38 < f12/f < -0.95$$

where f1 denotes a focal length of the first front lens group, f2 denotes a focal length of the second front lens group, f12 denotes a combined focal length of the first front lens group and the second front lens group.

In the first aspect of the present invention, it is preferable that the following conditional expression is preferably satisfied:

$$2.00 < f3/f < 3.59$$

where f3 denotes a focal length of the third front lens group.

In the first aspect of the present invention, it is preferable that the following conditional expression is satisfied:

$$1.05 < n4/n5 < 1.15$$

where n4 denotes a refractive index of the negative lens composing the first rear lens group at a reference wavelength, and n5 denotes a refractive index of the positive lens composing the first rear lens group at a reference wavelength.

In the first aspect of the present invention, it is preferable that the following conditional expression is satisfied:

$$2.30 < v5/v4 < 3.05$$

where v4 denotes an Abbe number of the negative lens composing the first rear lens group, and v5 denotes an Abbe number of the positive lens composing the first rear lens group.

In the first aspect of the present invention, it is preferable that an optical element (e.g. a plane parallel glass F1 in the embodiment) is disposed at least one of a space between the object and the lens, and a space between the last lens surface and an imaging surface.

According to a second aspect of the present invention, there is provided an imaging apparatus comprising: an imaging optical system including the wide-angle lens according to the first aspect; an imaging portion (e.g. an imaging device 72 in the embodiment) that detects an image of the object formed by the imaging optical system and converts into the electric signal; and an image processor that processes electrical signal output from the imaging portion and outputs an image of the object.

In the second aspect of the present invention, it is preferable that the image processor is constructed such that the image processor corrects distortion of the image detected by the imaging portion caused by the imaging optical system and outputs a corrected image.

In the second aspect of the present invention, it is preferable that the image processor is constructed such that the image processor corrects lateral chromatic aberration of the image detected by the imaging portion caused by the imaging optical system and outputs a corrected image.

In the second aspect of the present invention, it is preferable that the imaging apparatus further comprises: an image memory that stores the image output from the image processor; and it is preferable that the image memory stores in addition to the image at least one of the time the image was shot, the shooting direction of the image, the coordinates of the position where the image was shot, distance information of the object, and the model of the imaging apparatus.

In the second aspect of the present invention, it is preferable that the image processor obtains distance information of at least a designated place by using parallax on the basis of an electric signal of the image acquired from the imaging portion and the imaging optical system and an electric signal of the image acquired from another imaging apparatus.

With configuring a wide-angle lens according to the present invention as described above, it becomes possible to construct a wide-angle lens having a wide angle of view with being extremely compact capable of excellently correcting aberrations over entire field of view and reducing ghost images, and an imaging apparatus equipped with the wide-angle lens.

EMBODIMENTS FOR CARRYING OUT THE INVENTION

Figure 1:
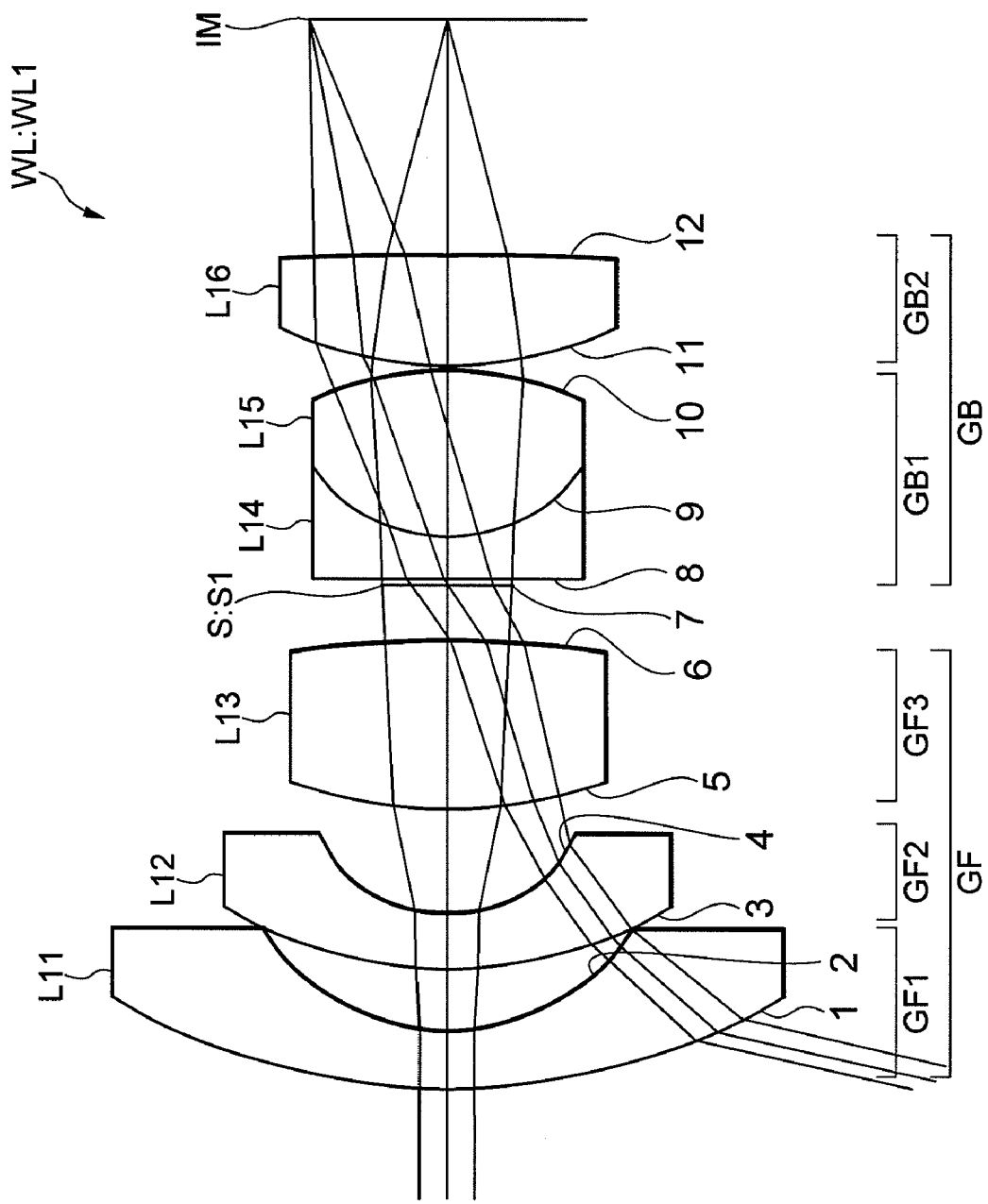
FIG. 1 is a diagram showing a lens configuration of a wide-angle lens according Example 1 of the present invention.

A preferred embodiment of the present invention is explained below with reference to the accompanying drawings. A lens configuration of a wide-angle lens WL according to the present embodiment is explained with reference to FIG. 1. Incidentally, the wide-angle lens WL shown in FIG. 1 is corresponding to a wide-angle lens WL1 according to Example 1, which will be explained later. The wide-angle lens WL is composed of, in order from an object side, a front lens group GF and a rear lens group GB. The front lens group GF consists of, in order from the object side, a first front lens group GF1 constructed by a negative meniscus lens L11 having a concave surface facing an image side, a second front lens group GF2 constructed by a negative lens L12 having a concave surface facing the image side, and a third front lens group GF3 constructed by a lens L13 having a convex surface facing the object side and having positive refractive power as a whole. Incidentally, although the third front lens group GF3 in the wide-angle lens shown in FIG. 1 (a wide-angle lens WL1 according to Example 1) is constructed by a single positive lens (a double convex positive lens) L13, the third front lens group GF3 may be constructed by a cemented lens having positive refractive power as a whole constructed by two lenses cemented with each other as shown in the following Examples. The rear lens group GB consists of, in order from the object side, a first rear lens group GB1 composed of a cemented lens constructed by a negative lens L14 and a positive lens L15 cemented in this order and having positive refractive power as a whole, and a second rear lens group GB2 constructed by a single positive lens (double convex lens) L16. In the wide-angle lens WL, an aperture stop S1 is disposed between the front lens group GF and the rear lens group GB.

The first front lens group GF1 and the second front lens group GF2 composing the front lens group GF have a function that makes an incident light ray pass through the aperture position (aperture stop S) by gradually changing a large angle of incidence into a small angle along the optical axis. As the angle of incidence becomes larger, the light ray passes through these lens groups GF1, GF2 on the periphery. Accordingly, in order to make curvature of meridional image generated in the positive direction small as much as possible, these lenses composing the first front lens group GF1 and the second front lens group GF2 are necessary to be disposed with making a concave surface facing the image side (In FIG. 1, the second surface and the fourth surface are concave surfaces facing the image side). Accordingly, since the angle of incidence becomes extremely large, at least a lens composing the first front lens group GF1 disposed to the most object side is necessary to be a meniscus shape having a convex surface facing the object side (In FIG. 1, it is constructed by a negative meniscus lens L11). Moreover, the third front lens group GF3 is constructed by a lens having a convex surface facing the object side and having positive refractive power as a whole, and has a function that converges light rays diverged by the first and second front lens groups GF1 and GF2 having negative refractive power.

On the other hand, the rear lens group GB is composed of two positive lens groups. The first rear lens group GB1 composing the rear lens group GB is a cemented lens constructed by a negative lens L14 cemented with a positive lens L15. With using a transparent material having higher dispersion to the negative lens L14 than that of the positive lens L15, the negative lens L14 has only one diverging function in the rear lens group GB. The second rear lens group GB2 disposed to the most image side is a positive lens L16, and has a function to keep the speed of the wide-angle lens by converging light rays.

Then, conditional expressions for the wide-angle lens WL having such a lens configuration to reach the speed of the lens (f-number) of 1.8 at an angle of incidence of 60 degrees or more are explained. The wide-angle lens is constructed with satisfying the following conditional expressions (1) through (4):

$$0.60 < f2/f1 < 1.95 \quad (1)$$

$$-0.36 < f12/f6 < -0.21 \quad (2)$$

$$-1.38 < f12/f < -0.95 \quad (3)$$

$$3.50 < f6/f < 5.20 \quad (4)$$

where f denotes a focal length of the wide-angle lens WL, f1 denotes a focal length of the first front lens group GF1, f2 denotes a focal length of the second front lens group GF2, f12 denotes a combined focal length of the first front lens group GF1 and the second front lens group GF2, and f6 denotes a focal length of the second rear lens group GB2.

Conditional expression (1) defines a ratio of the focal length of the first front lens group GF1 to that of the second front lens group GF2 composing the front lens group GF and having diverging effect. When the ratio is equal to or exceeds the upper limit of conditional expression (1), diverging effect of the first front lens group GF1 relatively becomes strong, and correspondingly the diverging effect of peripheral light becomes extremely strong, so that curvature of meridional image plane becomes too strong in the positive direction. As a result, it becomes impossible to correct astigmatism properly. On the other hand, when the ratio is equal to or falls below the lower limit of conditional expression (1), diverging effect of the first front lens group GF1 becomes weak relatively. In this case, a distance between the last lens surface (the twelfth lens surface in FIG. 1) of the wide-angle lens WL and the image plane IM, in other words the back focal length, becomes insufficient.

Conditional expression (2) defines relative value of the combined focal length f12 of the first front lens group GF1 and the second front lens group GF2 with respect to the focal length f6 of the second rear lens group GB2. In this case, the combined focal length f12 is negative and largely influences upon distortion. The degree of distortion is known to have an influence on the degree of the luminance of the peripheral portion of the image. When the relative value is equal to or falls below the lower limit of conditional expression (2), relative diverging power of the combined focal length f12 becomes weak, so that the amount of negative distortion decreases. As a result, luminance of the peripheral image becomes small, so that the angle of view cannot be secured sufficiently. On the other hand, when the relative value is equal to or exceeds the upper limit of conditional expression (2), relative diverging power of the combined focal length f12 becomes strong, so that the amount of negative distortion increases. As a result, although luminance of the peripheral image can be secured, curvature of meridional image plane caused by strong diverging effect becomes strong in the positive direction, so that sufficient angle of view cannot be maintained.

Conditional expression (3) defines relative value of the combined focal length f12 of the first front lens group GF1 and the second front lens group GF2 with respect to the focal length f of the wide-angle lens. In this case also, the combined focal length 12 is negative and the value of f12/f becomes negative without exception. When the relative value is equal to or falls below the lower limit of conditional expression (3), relative divergent power of the combined focal length f12 becomes weak, so that a distance between the last lens surface of the wide-angle lens WL and the image plane IM, in other words, the back focal length becomes insufficient, the angle of view cannot be kept wide, and curvature of meridional image plane becomes negative to be under correction. On the other hand, when the relative value is equal to or exceeds the upper limit of conditional expression (3), relative divergent power of the combined focal length f12 becomes strong. As a result, curvature of meridional image plane becomes positive to be overcorrected, and spherical aberration becomes positive to be overcorrected, so that aberrations cannot be corrected.

Conditional expression (4) contributes to the speed of the wide-angle lens WL. With defining the relative value of the positive focal length f6 of the second rear lens group GB2 as the relative value with respect to the focal length f of the wide-angle lens, when the ratio is equal to or exceeds the upper limit of conditional expression (4), refractive power of the second rear lens group GB2 becomes weak, so that the speed of the wide-angle lens becomes insufficient. On the other hand, when the relative value is equal to or falls below the lower limit of conditional expression (4), since refractive power of the second rear lens group GB2 increases, the speed of the wide-angle lens WL becomes fast, but coma on the periphery of the image cannot be corrected, so that it becomes worse.

In a wide-angle lens WL according to the present embodiment, in addition to conditional expressions (1) through (4), the following conditional expression (5) is preferably satisfied:

$$2.00 < f3/f < 3.59 \tag{5}$$

where f3 denotes a focal length of the third front lens group GF3 composing the front lens group GF.

Conditional expression (5) is indispensable for keeping Petzval sum of the wide-angle lens properly. When the ratio is equal to or falls below the lower limit of conditional expression (5), converging power of the third front lens group GF3 becomes too strong, so that Petzval sum becomes large in the positive direction, in other words, Petzval sum becomes under correction. As a result, negative curvature of field is generated, and it cannot be corrected. On the other hand, when the ratio is equal to or exceeds the upper limit of conditional expression (5), converging power of the third front lens group GF3 becomes too weak, Petzval sum becomes large in the negative direction, in other words, Petzval sum becomes overcorrection. As a result, positive curvature of field is generated, and it cannot be corrected.

In a wide-angle lens WL according to the present embodiment, in addition to the above-described conditional expressions, the following conditional expression (6) is preferably satisfied:

$$1.05 < n4/n5 < 1.15 \tag{6}$$

where n4 denotes a refractive index of a negative lens L14 in a cemented lens constructing the first rear lens group GB1 of the rear lens group GB at the reference wavelength (the reference wavelength in the present embodiment is d-line), and n5 denotes a refractive index of a positive lens L15 in a cemented lens constructing the first rear lens group GB1 of the rear lens group GB at the reference wavelength.

In a wide-angle lens WL having such a lens configuration, since only two positive lens components (the first rear lens group GB1 and the second rear lens group GB2) are disposed between the aperture stop S1 and the image plane IM, it cannot be avoided that the inner coma tends to be generated. Accordingly, the cemented lens constructed by the negative lens L14 cemented with the positive lens L15 is disposed as the first rear lens group GB1 in the rear lens group GB, and diverging effect is provided to the cemented surface (the ninth surface in FIG. 1) by making refractive index n4 of the negative lens L14 higher than refractive index n5 of the positive lens L15, so that coma is corrected. However, when the ratio is equal to or exceeds the upper limit of conditional expression (6), diverging effect of the cemented surface becomes too strong, so that positive coma becomes conspicuous. On the other hand, when the ratio is equal to or falls below the lower limit of conditional expression (6), diverging effect of the cemented surface becomes too weak, so that it becomes impossible to correct negative coma.

In a wide-angle lens WL according to the present embodiment, the following conditional expression (7) is preferably satisfied:

$$2.30 < v5/v4 < 3.05 \qquad (7)$$

where v4 denotes an Abbe number of the negative lens L14 of the above-described cemented lens, and v5 denotes an Abbe number of the positive lens L15 of the above-described cemented lens.

As described above, in a wide-angle lens WL having such a lens configuration, since only two positive lens components are disposed between the aperture stop S1 and the image plane IM, chromatic aberration tends to be under-corrected. Since negative lens components are dominant to the object side of the aperture stop S1 in particular, lateral chromatic aberration is generated, and the image height of the light having shorter wavelength than the reference wavelength tends to become relatively lower. In order to dissolve this, it is necessary to select a material having large dispersion to the third front lens group GF3 (positive lens L13) composing the front lens group GF. As a result, longitudinal chromatic aberration becomes under-corrected, in other words, the light having shorter wavelength than the reference wavelength forms an image near to the wide-angle lens WL. As for lateral chromatic aberration, the light having shorter wavelength than the reference wavelength still tends to become relatively lower. With properly choosing (satisfying conditional expression (7)) dispersion of the materials of the cemented lens of the first rear lens group GB1 composing the rear lens group GB, longitudinal chromatic aberration as well as lateral chromatic aberration can be excellently corrected. However, when the ratio is equal to or exceeds the upper limit of conditional expression (7), dispersion of the negative lens L14 becomes too large with respect to that of the positive lens L15, so that chromatic aberration becomes overcorrection. On the other hand, when the ratio is equal to or falls below the lower limit of conditional expression (7), dispersion of the negative lens L14 is not sufficiently large with respect to that of the positive lens L15, so that chromatic aberration becomes under-correction.

With configuring a wide-angle lens WL according to the present embodiment as described above, since the lens can be constructed by fewer number of lenses, so that it becomes possible to construct a wide-angle lens having a wide angle of view with being extremely compact capable of excellently correcting aberrations over entire field of view and reducing ghost images.

Figure 19:
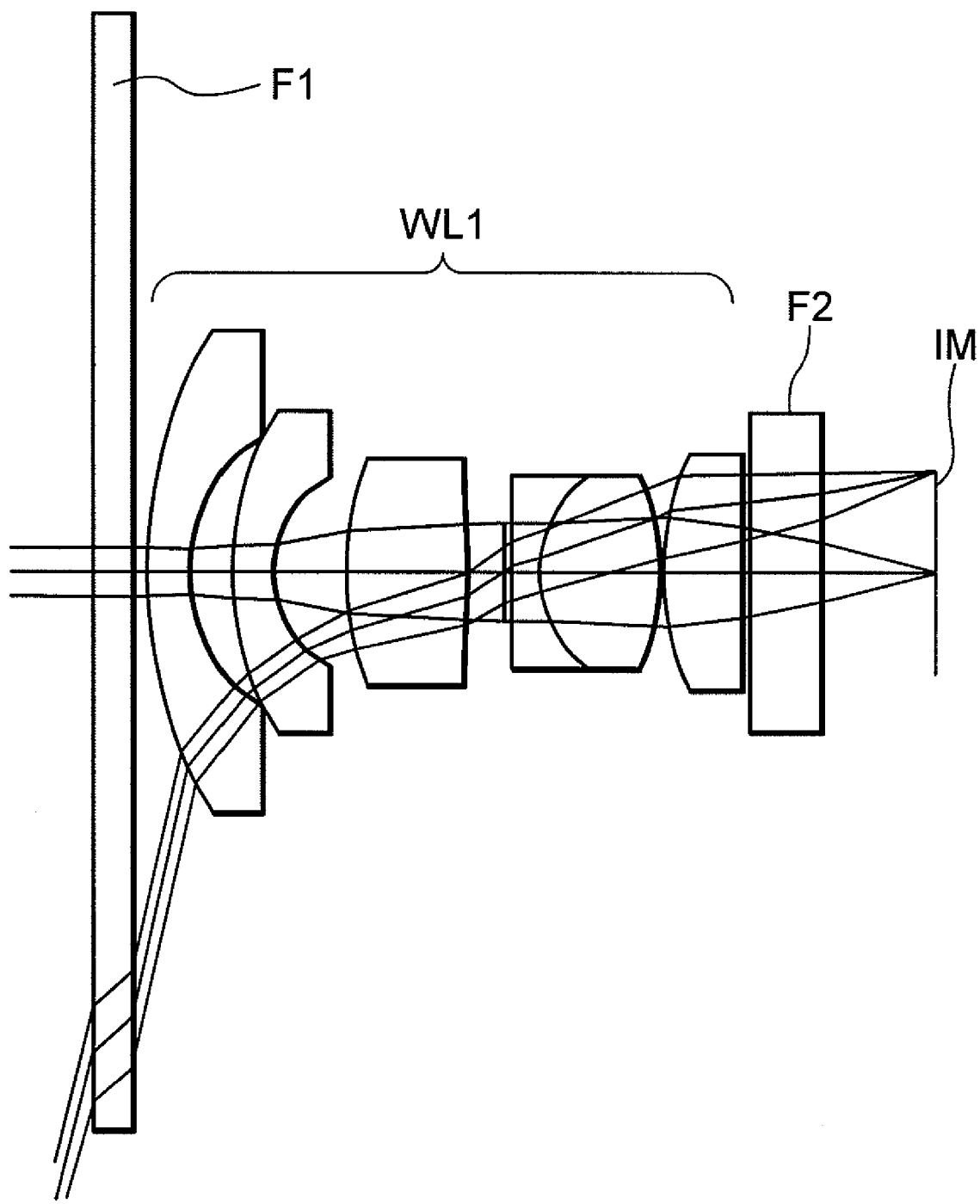
FIG. 19 is a diagram showing a lens configuration of a wide-angle lens according to a variation of Example 1.

FIG. 19 is a diagram showing a variation that a plane parallel glass F1 for protecting the lens is added to the object side, and a low-pass filter and wavelength selecting filter F2, which is a plane parallel member, is added between the last lens surface and the image plane IM of a wide-angle lens same as the one according to Example 1 (wide-angle lens WL1).

Figure 20:
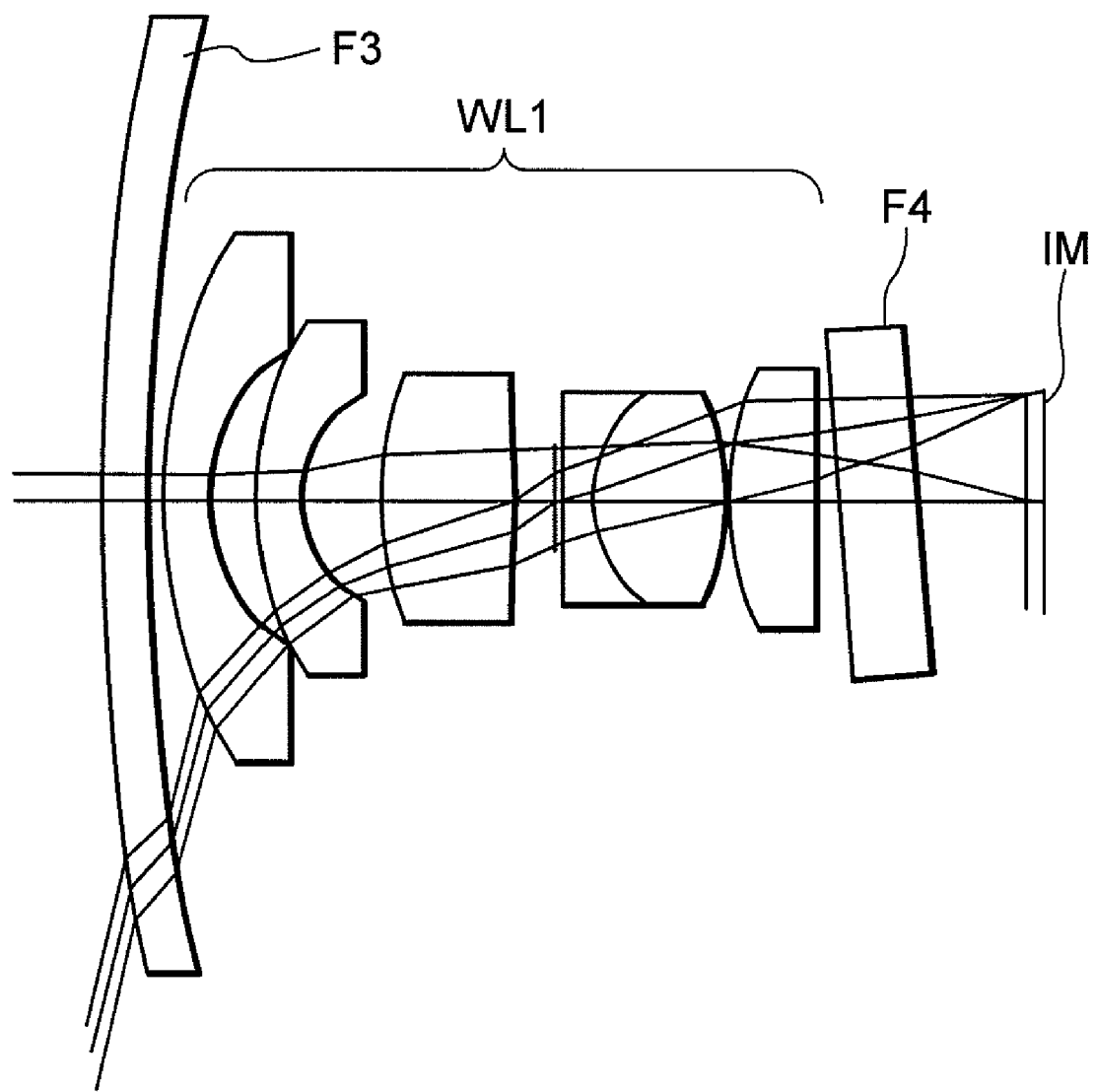
FIG. 20 is a diagram showing a lens configuration of a wide-angle lens according to a variation of Example 1.

FIG. 20 has a wide-angle lens same as the one according to Example 1 (wide-angle lens WL1) similar to FIG. 19, but a protecting member F3 disposed to the object side of the lens has a slight curvature. A plane parallel member F4 provided between the last lens surface and the image plane IM is tilted so as to avoid an effect of internal reflection of the lens or reflection between the lens and the imaging surface. In this manner, when a weak refractive power member having a focal length of |10f| or more is added to the wide-angle lens having a focal length of f, the focal length or aberration characteristic scarcely changes.

Figure 2:
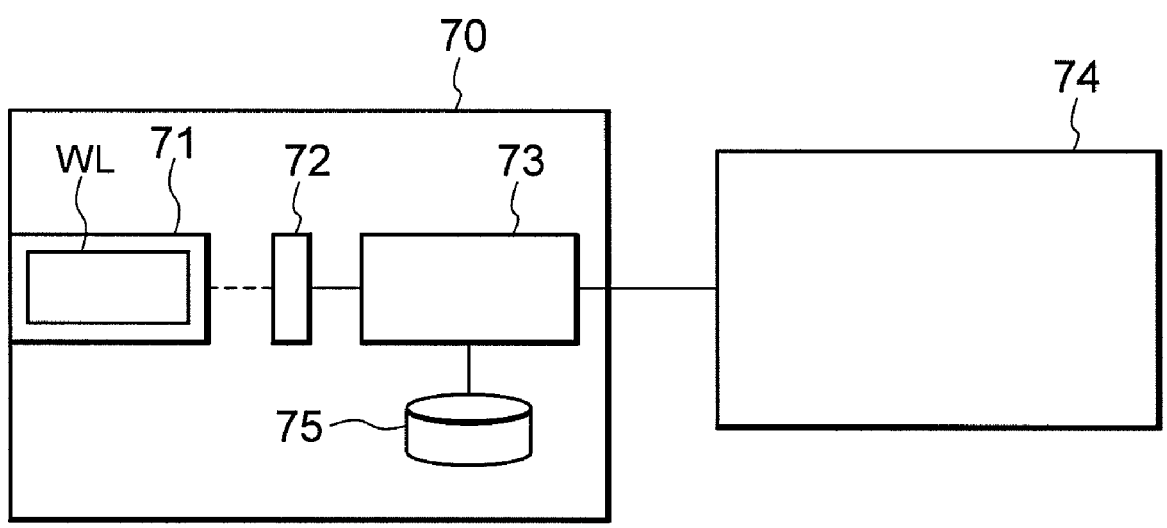
FIG. 2 is a block diagram showing a configuration of an imaging apparatus according to the present invention.

Then, an imaging apparatus using such a wide-angle lens WL is explained. FIG. 2 shows an imaging apparatus 70 for taking a picture equipped with the above-described wide-angle lens WL. The imaging apparatus 70 is composed of an image-taking optical system 71 equipped with the above-described wide-angle lens WL and forming an image of an unillustrated object, an imaging device 72 that detects the image formed by the image-taking optical system 71 and outputs as an electric signal, and an image processor 73 that generates an object image from the electric signal output from the imaging device 72 and outputs to a display 74. Generally, in a wide-angle lens, a position of an exit pupil tends to come extremely near to the image plane. However, in a wide-angle lens WL according to the present embodiment, since two positive lens groups are disposed to the image side of the aperture stop S1, the position of the exit pupil comes away to the object side of the image plane IM. Accordingly, the wide-angle lens WL is outstanding as a lens system (image-taking optical system 71) of an imaging apparatus 70 having a restriction on the exit pupil.

Figure 3:
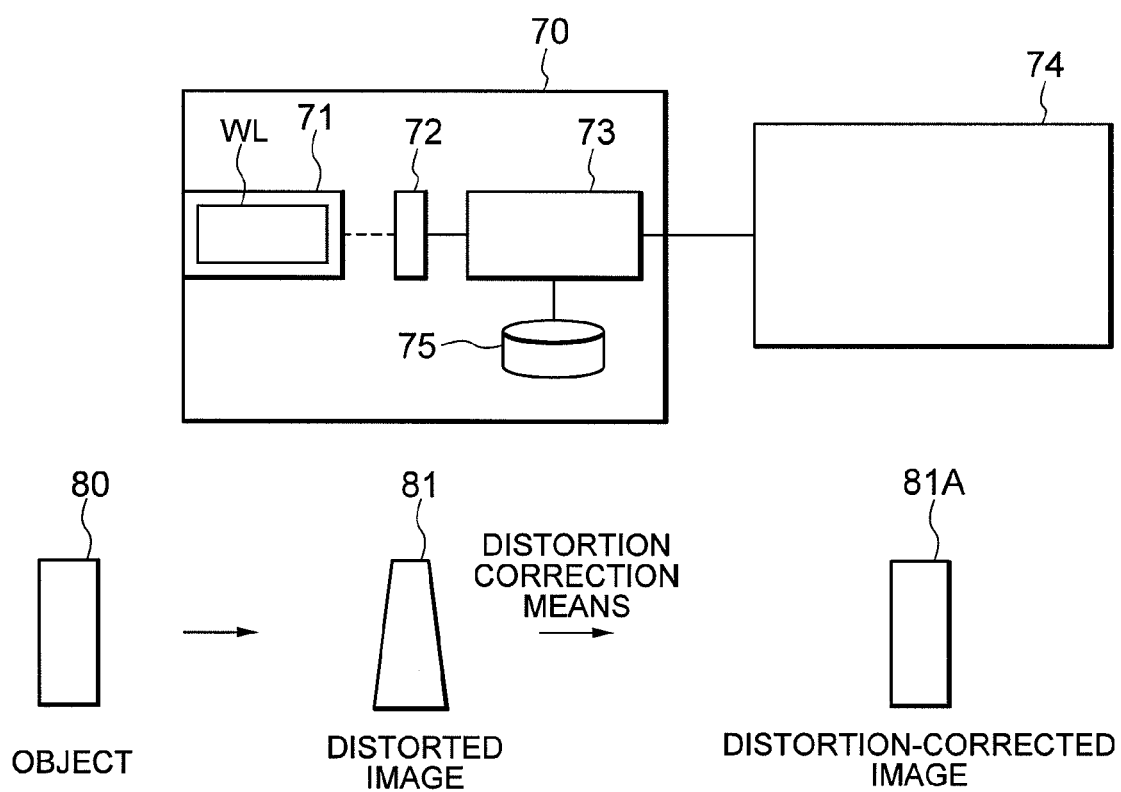
FIG. 3 is a block diagram explaining correction of distorted images by the above-described imaging apparatus.
Figure 4:
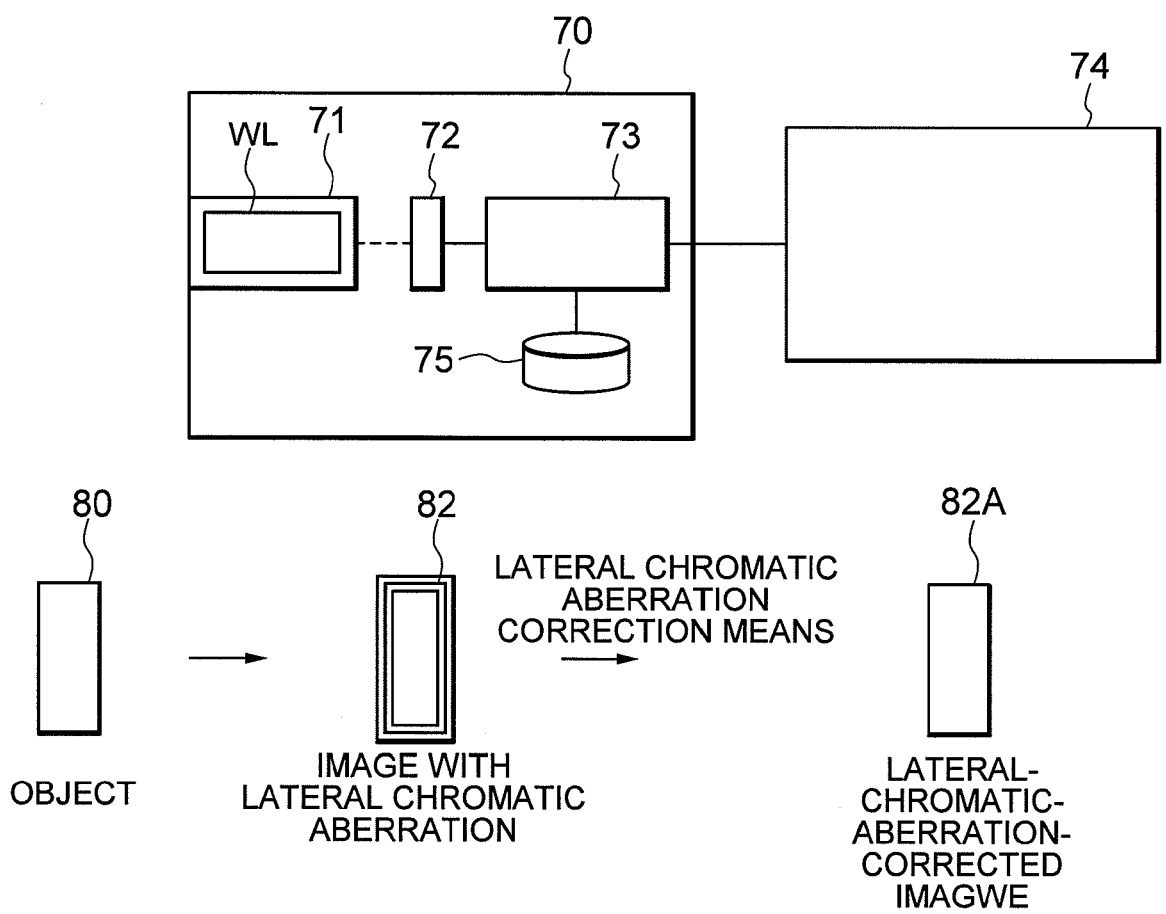
FIG. 4 is a block diagram explaining correction of lateral chromatic aberration by the above-described imaging apparatus.

As described above, although a wide-angle lens WL according to the present embodiment has an excellent characteristic to the distortion of the image, in an image-taking optical system 71 as a whole, it may be happen that, for example, when a rectangular surface 80 of an object is photographed, a distorted image 81 may be obtained as shown in FIG. 3. In this case, the amount of distortion of the image-taking optical system 71 is derived by calculations in advance, or the amount of distortion is measured and stored in an unillustrated distortion correction table, and distortion correction is carried out to the electric signal output from the imaging device 72 by the image processor 73 on the basis of the information of the distortion correction table, and a precise image can be output by displaying as a distortion-corrected image 81A on the display 74. Similarly, as shown in FIG. 4, when an image 82 including lateral chromatic aberration is obtained by the image-taking optical system 71, with correcting by image processing to each color pixel by the image processor 73, a lateral-chromatic-aberration-corrected image 82A can be output to the display 73.

An image memory 75 for storing an image of the object generated by the image processor 73 can be provided in the imaging apparatus 70. In this case, it is needless to say that the image processor 73 can store an image in the image memory 75 without carrying out specific processing for correcting the shape of an image to a taken image.

Particularly, in an apparatus in which storing a raw data is desired in view of the law or the admissibility of evidence, an image memory 75 through an image processor 73 having a certain amount of limitation is necessary, or the image memory 75 may be branched directly after the imaging device (imaging portion) 72 depending on circumstances.

Figure 5:
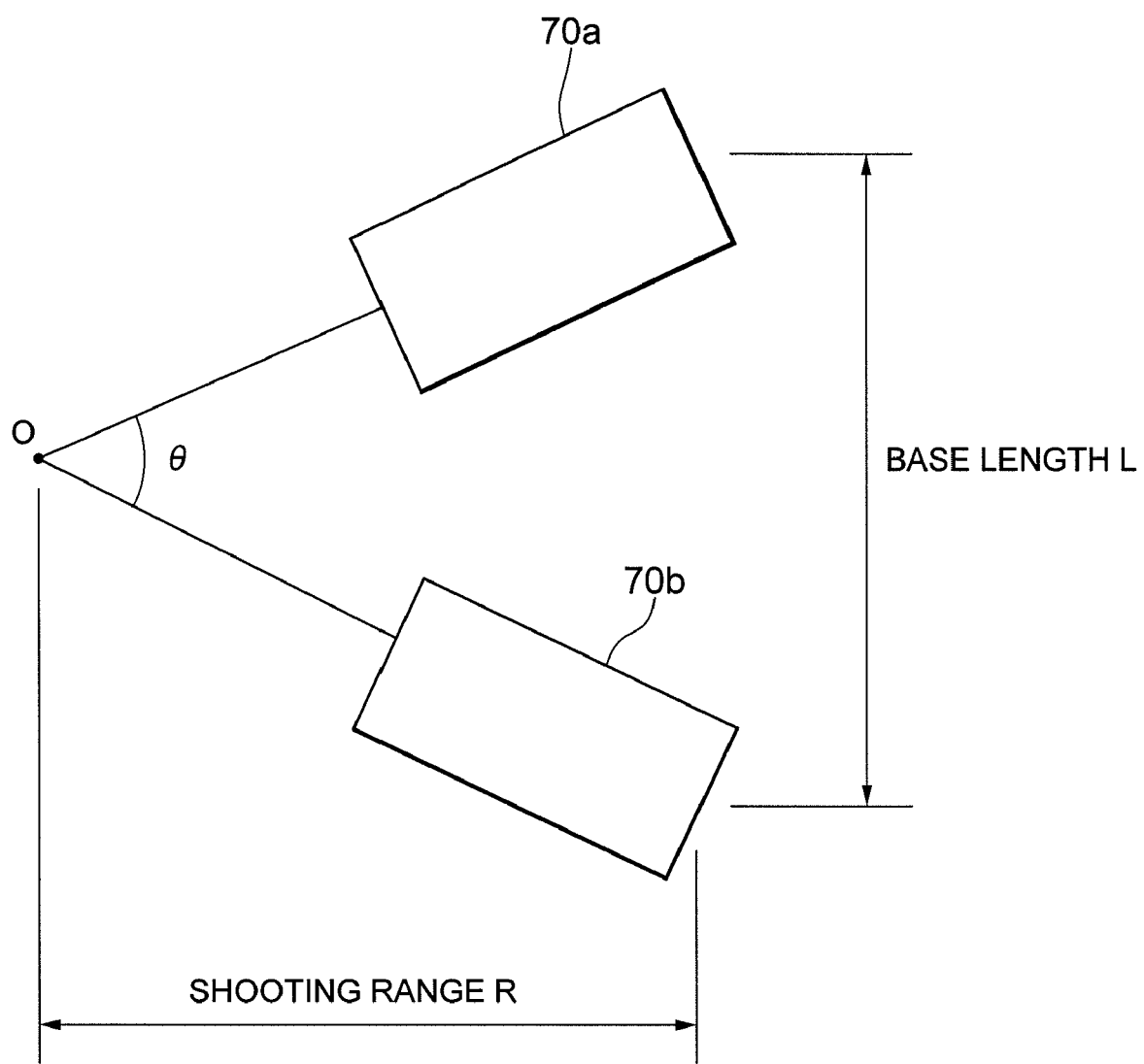
FIG. 5 is a diagram explaining a way to obtain distance information to an object.

In each case, in addition to the image detected by the imaging device 72, at least one of a shooting time, a direction (an azimuth), the coordinates of the imaging apparatus 70 upon shooting (for example, it is obtained from a GPS or the like), distance information of the object, the model of the imaging apparatus 70 may be stored in the image memory 75. For example, when a distance to the object is to be measured, at least two imaging apparatuses 70 are provided as shown in FIG. 5 (In FIG. 5, a case that two imaging apparatuses 70a and 70b are provided is shown). The distance information to the object can be obtained by using parallax. In FIG. 5, when the object (the object to be measured) is located at the point O, parallax of the two imaging apparatuses 70a and 70b is set to be θ, the relation between the base length L and the shooting range R is determined by the following expression (8), so that when the base length L is known, the shooting range R can be derived:

$$R \times \theta = L \qquad (8).$$

Then, specific examples of a wide-angle lens WL constructed as described above are shown below.

Example 1

FIG. 1 is a diagram showing a lens configuration of a wide-angle lens WL1 according Example 1 of the present invention. In Example 1, a front lens group GF is composed of a first front lens group GF1 that is composed of a negative meniscus lens L11 having a concave surface (a second surface) facing an image side, a second front lens group GF2 that is composed of a negative meniscus lens (negative lens) L12 having a concave surface (a fourth surface) facing an image side, and a third front lens group GF3 that is composed of a double convex lens (positive lens) L13 having a convex surface (a fifth surface) facing the object side. A rear lens group GB is composed of a first rear lens group GB1 that is composed of a cemented lens constructed by a negative meniscus lens (negative lens) L14 cemented with a double convex lens (positive lens) L5 [sic], and a second rear lens group GB2 that is composed of a double convex lens (positive lens) L16. An aperture stop S1 is disposed between the front lens group GF and the rear lens group GB.

Various values associated with each lens according to Example 1 are listed in Table 1. In Table 1, respective surface numbers 1 through 12 relate to the wide-angle lens WL1 according to Example 1 and correspond to reference numbers 1 through 12 shown in FIG. 1. In [Specifications] in Table 1, f denotes a focal length of the wide-angle lens, f1 denotes a focal length of the first front lens group GF1, f2 denotes a focal length of the second front lens group GF2, f3 denotes a focal length of the third front lens group GF3, f12 denotes a combined focal length of the first and the second front lens groups GF1 and GF2, f6 denotes a focal length of the second rear lens group GB2, FNO denotes an f-number, ω denotes the maximum angle of incidence of light ray (in the following tables, a value of 2ω is shown), and Ymax denotes the maximum image height. In [Lens Data], "i" denotes a surface number, "r" denotes a radius of curvature of the lens surface, "d" denotes a distance between lens surfaces, "ν" denotes an Abbe number, and "nd" denotes a refractive index with respect to the reference wavelength (d-line). Refractive index of the air nd=1.000000 is omitted. In respective tables for various values, "mm" is generally used for the unit of length such as the radius of curvature r, surface distance d, and respective focal lengths f, f1, f2, f12, f3, f6. However, since similar optical performance can be obtained by an optical system proportionally enlarged or reduced its dimension, the unit is not necessarily to be limited to "mm", and any other suitable unit can be used. The explanation of reference symbols is the same in the other Examples, so that duplicated explanations are omitted. Moreover, the reference wavelength is not limited to d-line, so that other wavelengths including ultraviolet light and infrared light may suitably be used without problems.

TABLE 1

[Specifications]

| | |
|---|---|
| f = | 10 |
| f1 = | −36.14147 |
| f2 = | −24.76507 |
| f3 = | 35.28969 |
| f12 = | −12.90120 |
| f6 = | 37.18672 |

TABLE 1-continued

| | | |
|---|---|---|
| FNO = | | 2 |
| 2ω = | | 155° |
| Ymax = | | 12.494 |

[Lens Data]

| i | r | d | ν | nd | |
|---|---|---|---|---|---|
| 1 | 59.61733 | 5.11843 | 40.766 | 1.8636320 | L11 |
| 2 | 19.67182 | 5.46183 | | | |
| 3 | 38.11564 | 4.98634 | 40.766 | 1.8636320 | L12 |
| 4 | 12.86968 | 9.39515 | | | |
| 5 | 42.74427 | 14.83475 | 17.984 | 1.9040130 | L13 |
| 6 | −105.04955 | 4.90516 | | | |
| 7 | ∞ | 0.42654 | Aperture Stop S1 | | |
| 8 | 554.40139 | 3.83882 | 17.984 | 1.9040130 | L14 |
| 9 | 14.33586 | 14.92874 | 49.599 | 1.7579420 | L15 |
| 10 | −28.51705 | 0.42654 | | | |
| 11 | 34.70800 | 9.70419 | 20.881 | 1.8870400 | L16 |
| 12 | −577.51010 | 21.11575 | | | |

[Values for Conditional Expressions]

(1) f2/f1 = 1.459
(2) f12/f6 = −0.347
(3) f12/f = −1.290
(4) f6/f = 3.719
(5) f3/f = 3.529
(6) n4/n5 = 1.083
(7) ν5/ν4 = 2.758

As shown above, conditional expressions (1) through (7) are fully satisfied in Example 1.

Figure 6:
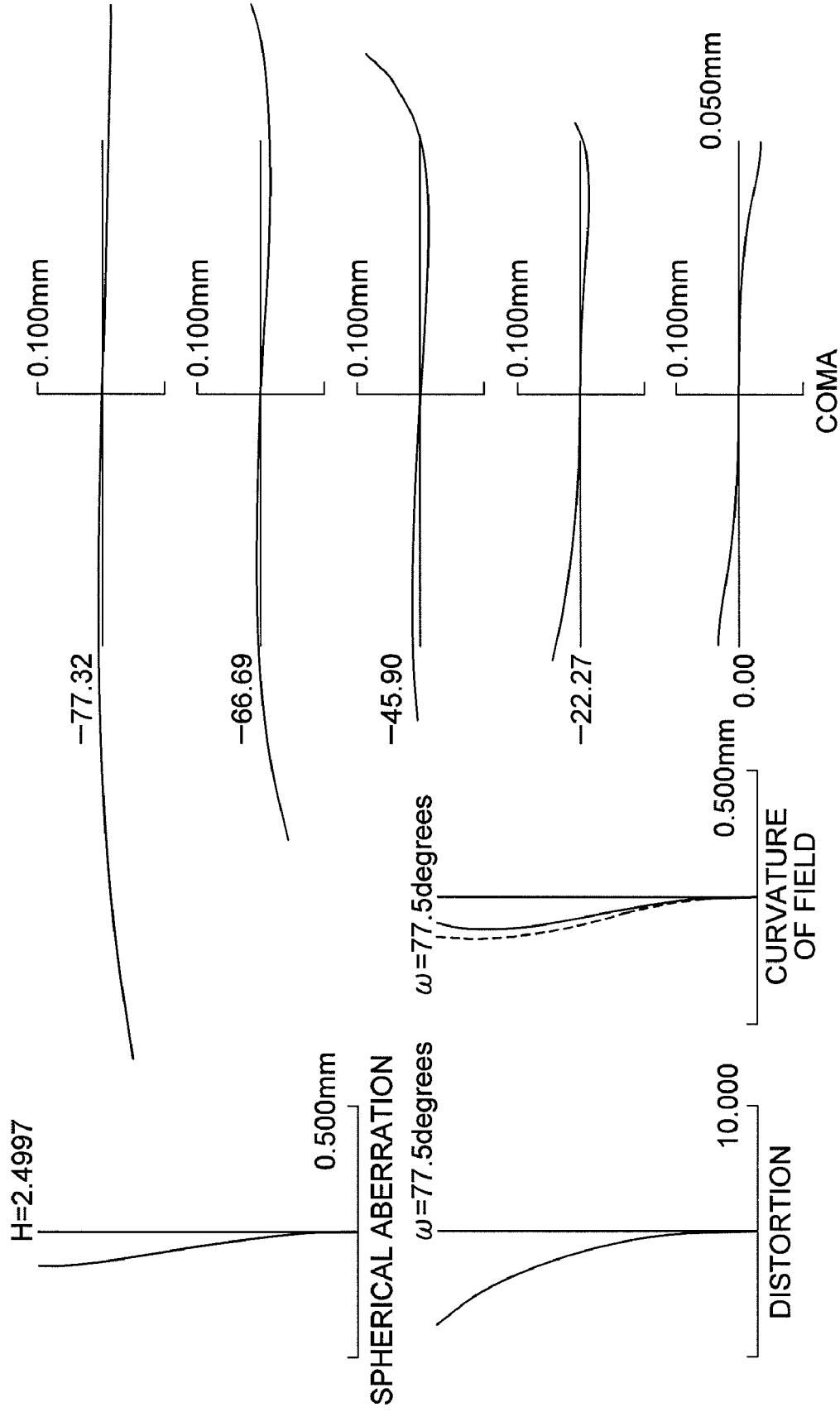
FIG. 6 shows various aberrations of the wide-angle lens according to Example 1.

FIG. 6 shows various aberrations, that is, spherical aberration, curvature of field, distortion and coma of the wide-angle lens according to Example 1. In respective graphs showing spherical aberration, the maximum value of the vertical axis is H (the height of incident ray). In respective graphs showing curvature of field and distortion, the maximum value of the vertical axis is ω. In respective graphs showing coma, the maximum value of horizontal axis is H. The notation of distortion is set on the basis of an equidistance projection lens (y=f×θ (radian), θ denotes an angle of incidence). In respective graphs showing curvature of field, a solid line indicates a sagittal image plane, and a broken line indicates a meridional image plane. The unit of the length is mm, and the focal length is normalized to 10 mm. The explanations of various aberration graphs are the same as the following Examples. As is apparent from the respective graphs, the wide-angle lens according to Example 1 shows superb optical performance as a result of good corrections to various aberrations.

Example 2

Figure 7:
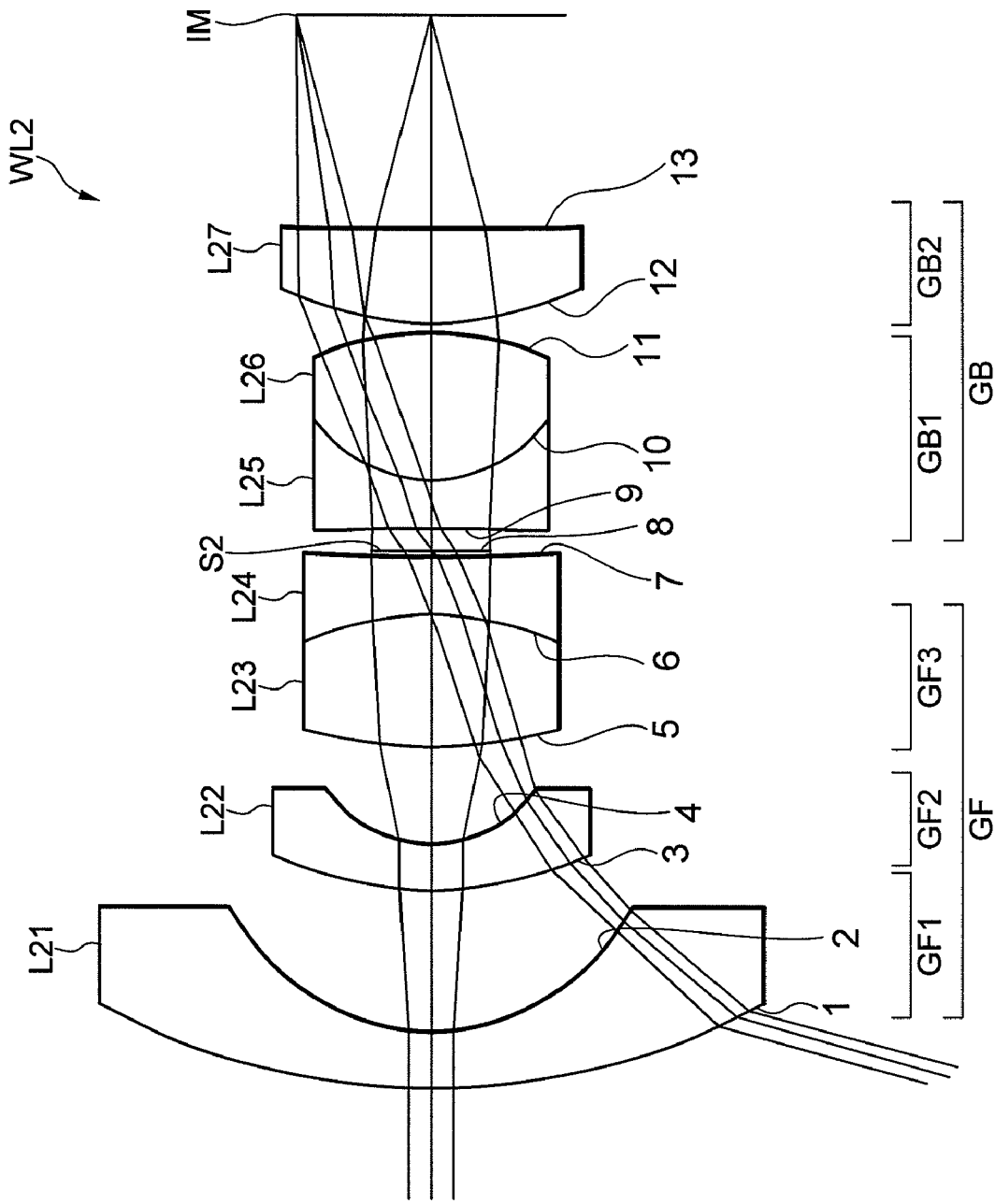
FIG. 7 is a diagram showing a lens configuration of a wide-angle lens according to Example 2 of the present invention.

FIG. 7 is a diagram showing a lens configuration of a wide-angle lens WL2 according Example 2 of the present invention. In Example 2, a front lens group GF is composed of a first front lens group GF1 that is composed of a negative meniscus lens L21 having a concave surface (second surface) facing an image side, a second front lens group GF2 that is composed of a negative meniscus lens (negative lens) L22 having a concave surface (fourth surface) facing the image side, and a third front lens group GF3 that is composed of a cemented lens constructed by a double convex lens L23 having a concave surface (fifth surface) facing an object side cemented with a double concave lens L24. A rear lens group GB is composed of a first rear lens group GB1 that is composed of a cemented lens constructed by a double concave lens (negative lens) L25 cemented with a double convex lens (positive lens) L26, and a second rear lens group GB2 that is composed of a positive meniscus lens (positive lens) L27. An aperture stop S2 is disposed between the front lens group GF and the rear lens group GB.

Various values associated with each lens according to Example 2 are listed in Table 2. In Table 2, respective surface numbers 1 through 13 relate to the wide-angle lens WL2 according to Example 2 and correspond to reference numbers 1 through 13 shown in FIG. 7.

TABLE 2

[Specifications]

| | |
|---|---|
| f = | 10 |
| f1 = | −39.29294 |
| f2 = | −29.56078 |
| f3 = | 33.67936 |
| f12 = | −13.71508 |
| f6 = | 39.04457 |
| FNO = | 2 |
| 2ω = | 150° |
| Ymax = | 12.50 |

[Lens Data]

| i | r | d | ν | nd | |
|---|---|---|---|---|---|
| 1 | 65.09584 | 5.21740 | 40.806 | 1.8636790 | L21 |
| 2 | 21.47854 | 12.95977 | | | |
| 3 | 34.12160 | 4.34783 | 50.346 | 1.7066870 | L22 |
| 4 | 12.27371 | 9.04696 | | | |
| 5 | 44.71569 | 12.17392 | 17.984 | 1.9040130 | L23 |
| 6 | −29.53316 | 5.21740 | 64.199 | 1.5088390 | L24 |
| 7 | 177.83059 | 0.43478 | | | |
| 8 | ∞ | 2.17392 | Aperture Stop S2 | | |
| 9 | −498.34767 | 4.34783 | 17.984 | 1.9040130 | L25 |
| 10 | 13.53040 | 13.52147 | 46.570 | 1.7999300 | L26 |
| 11 | −28.75281 | 0.86957 | | | |
| 12 | 32.05316 | 8.69566 | 40.806 | 1.8636790 | L27 |
| 13 | 566.27068 | 19.68928 | | | |

[Values for Conditional Expressions]

(1) f2/f1 = 0.752
(2) f12/f6 = −0.351
(3) f12/f = −1.372
(4) f6/f = 3.904
(5) f3/f = 3.368
(6) n4/n5 = 1.058
(7) ν5/ν4 = 2.590

Figure 8:
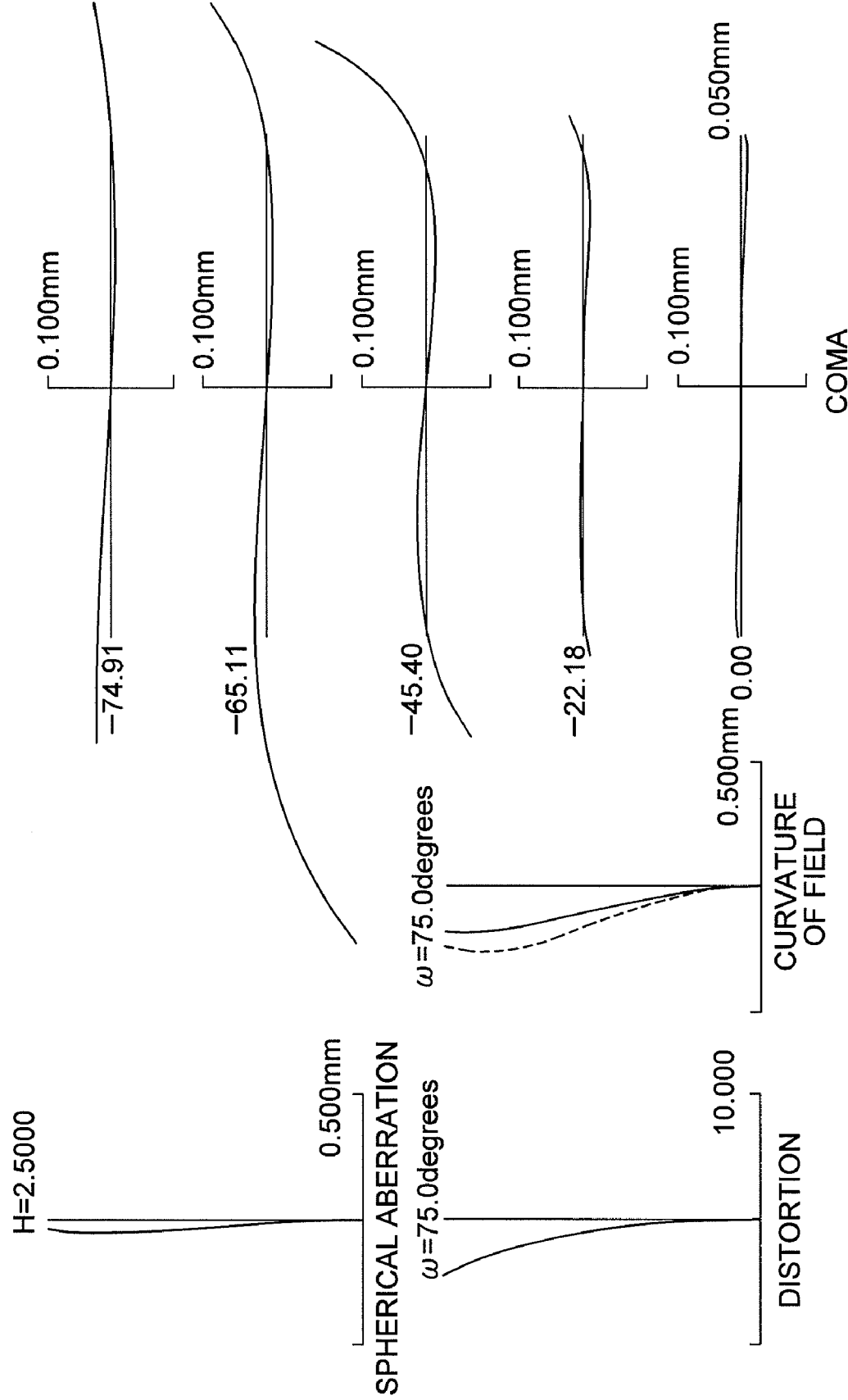
FIG. 8 shows various aberrations of the wide-angle lens according to Example 2.

As shown above, conditional expressions (1) through (7) are fully satisfied in Example 2. FIG. 8 shows various aberrations of the wide-angle lens according to Example 2. As is apparent from the respective graphs, the wide-angle lens according to Example 2 shows superb optical performance as a result of good corrections to various aberrations.

Example 3

Figure 9:
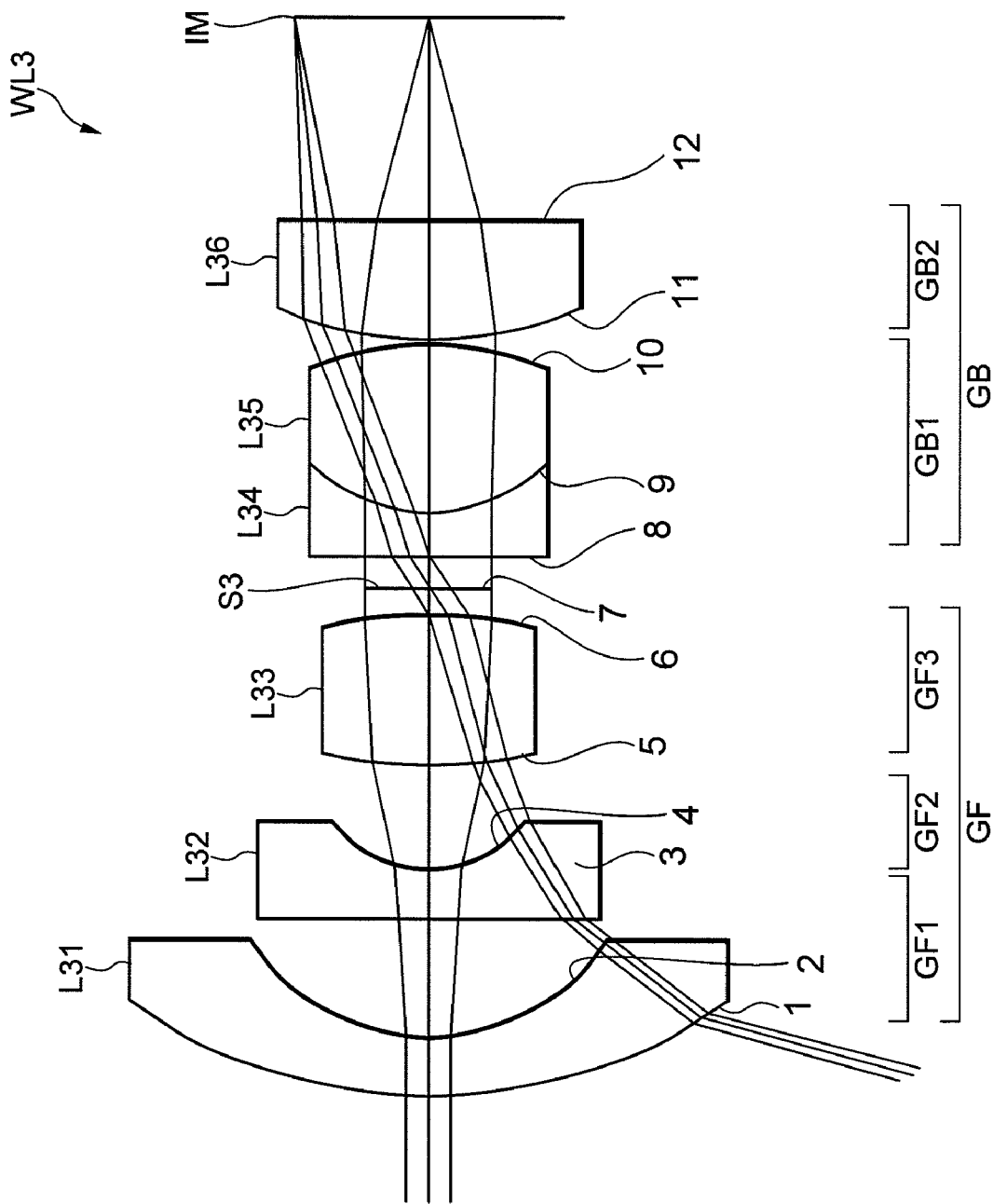
FIG. 9 is a diagram showing a lens configuration of a wide-angle lens according to Example 3 of the present invention.

FIG. 9 is a diagram showing a lens configuration of a wide-angle lens WL3 according Example 3 of the present invention. In Example 3, a front lens group GF is composed of a first front lens group GF1 that is composed of a negative meniscus lens L31 having a concave surface (second surface) facing an image side, a second front lens group GF2 that is composed of a plano-concaves lens (negative lens) L32 having a concave surface (fourth surface) facing the image side, and a third front lens group GF3 that is composed of a double convex lens L33 having a convex surface (fifth surface) facing an object side. A rear lens group GB is composed of a first rear lens group GB1 that is composed of a cemented lens constructed by a plano-concave lens (negative lens) L34 cemented with a double convex lens (positive lens) L35, and a second rear lens group GB2 that is composed of a plano-convex lens (positive lens) L36. An aperture stop S3 is disposed between the front lens group GF and the rear lens group GB.

Various values associated with each lens according to Example 3 are listed in Table 3. In Table 3, respective surface numbers 1 through 12 relate to the wide-angle lens WL3 according to Example 3 and correspond to reference numbers 1 through 12 shown in FIG. 9.

TABLE 3

[Specifications]

| | |
|---|---|
| f = | 10 |
| f1 = | −42.88445 |
| f2 = | −23.33378 |
| f3 = | 26.87862 |
| f12 = | −12.83144 |
| f6 = | 39.33183 |
| FNo = | 2 |
| 2ω = | 150° |
| Ymax = | 12.49490 |

[Lens Data]

| i | r | d | ν | nd | |
|---|---|---|---|---|---|
| 1 | 48.96976 | 5.27549 | 40.766 | 1.8829970 | L31 |
| 2 | 20.27548 | 11.03457 | | | |
| 3 | ∞ | 4.39624 | 64.103 | 1.5168000 | L32 |
| 4 | 12.05890 | 9.67174 | | | |
| 5 | 46.09022 | 13.62836 | 20.881 | 1.9228600 | L33 |
| 6 | −46.09022 | 2.63775 | | | |
| 7 | ∞ | 2.85756 | Aperture Stop S3 | | |
| 8 | ∞ | 3.95662 | 17.984 | 1.9459440 | L34 |
| 9 | 15.21540 | 15.38685 | 53.868 | 1.7129950 | L35 |
| 10 | −27.60270 | 0.43962 | | | |
| 11 | 34.72989 | 10.99061 | 40.766 | 1.8829970 | L36 |
| 12 | ∞ | 18.57039 | | | |

[Values for Conditional Expressions]

(1) f2/f1 = 1.838
(2) f12/f6 = −0.326
(3) f12/f = −1.283
(4) f6/f = 3.933
(5) f3/f = 2.688
(6) n4/n5 = 1.136
(7) ν5/ν4 = 2.995

Figure 10:
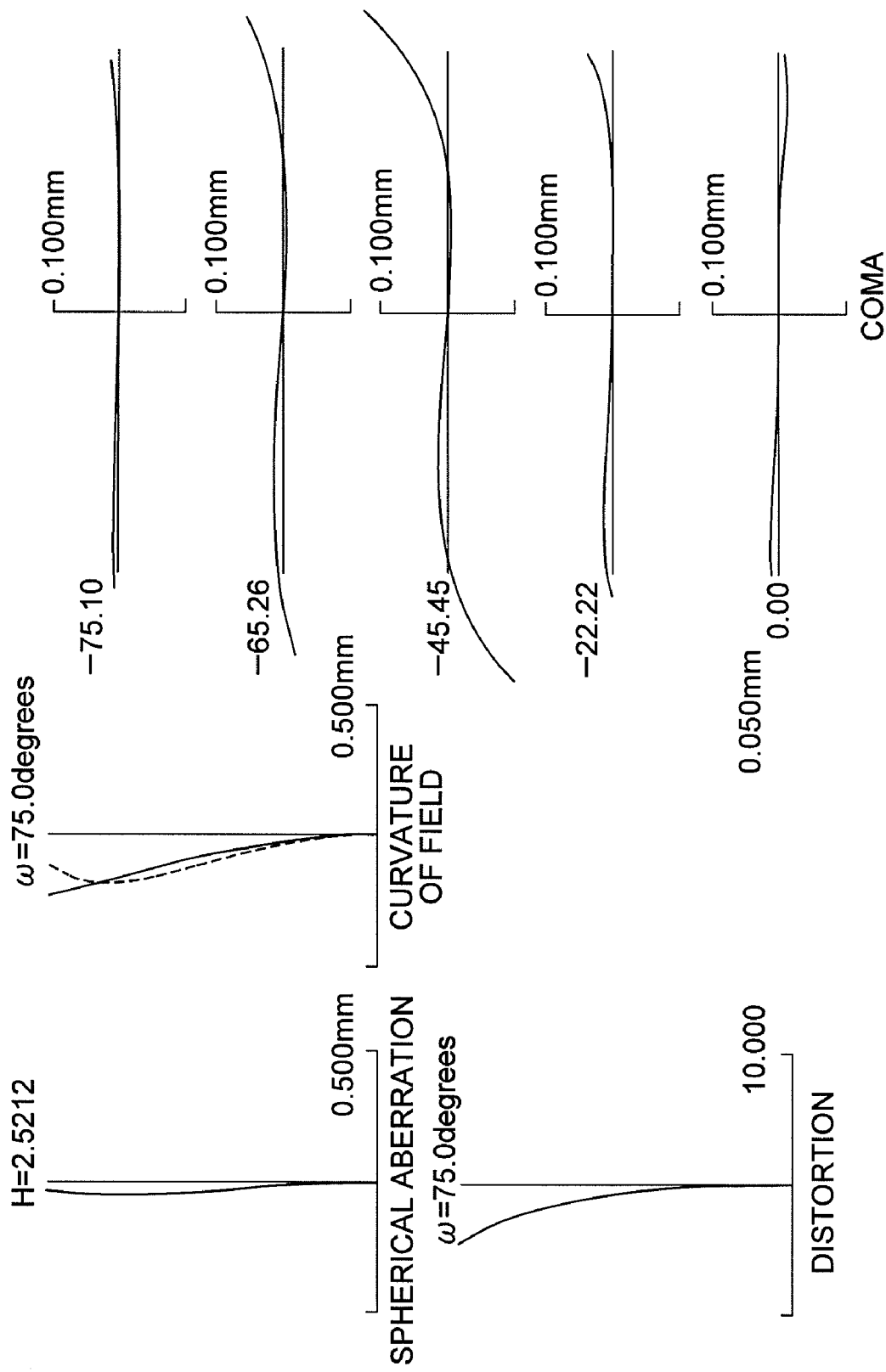
FIG. 10 shows various aberrations of the wide-angle lens according to Example 3.

As shown above, conditional expressions (1) through (7) are fully satisfied in Example 3. FIG. 10 shows various aberrations of the wide-angle lens according to Example 3. As is apparent from the respective graphs, the wide-angle lens according to Example 3 shows superb optical performance as a result of good corrections to various aberrations.

Example 4

Figure 11:
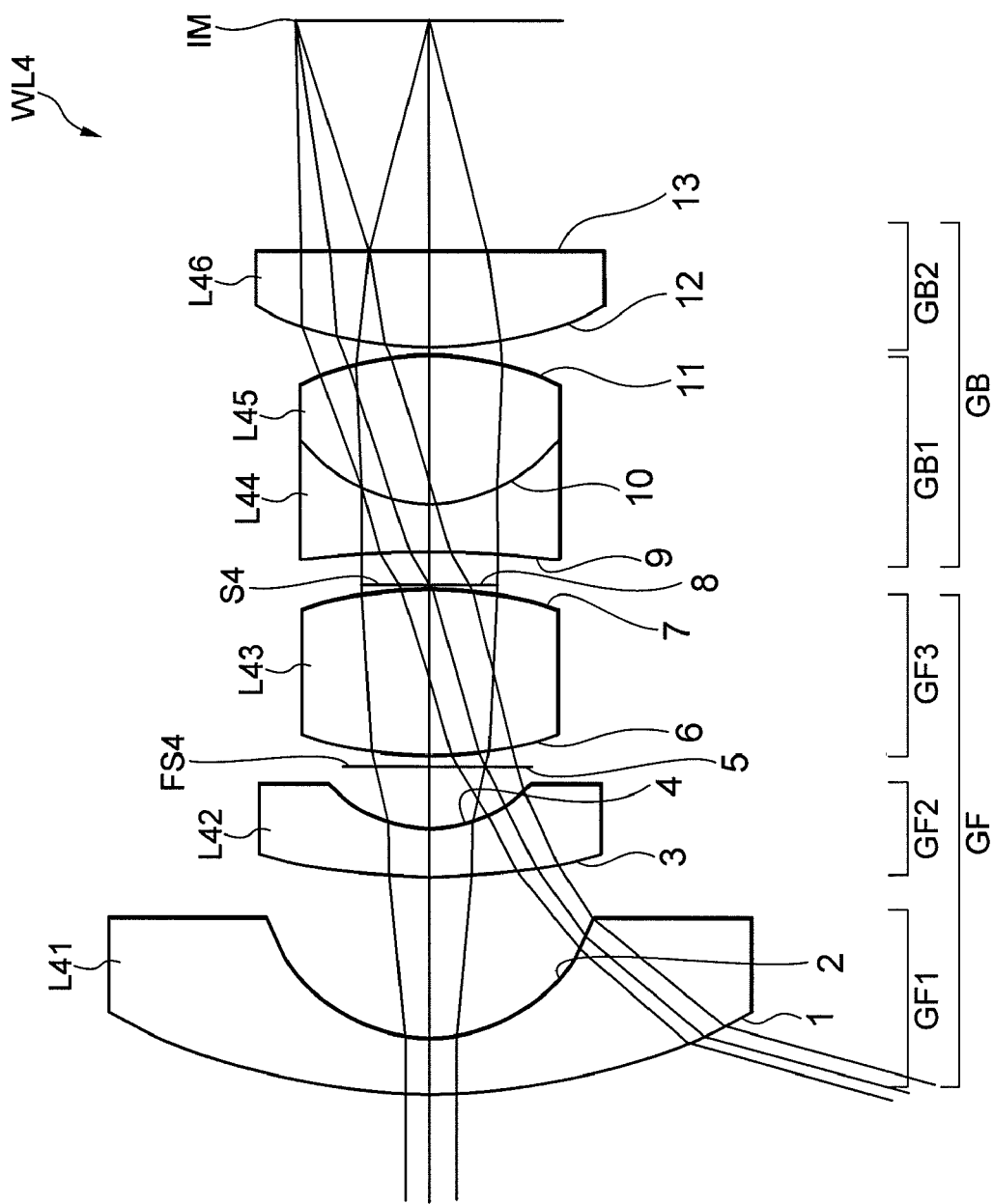
FIG. 11 is a diagram showing a lens configuration of a wide-angle lens according to Example 4 of the present invention.

FIG. 11 is a diagram showing a lens configuration of a wide-angle lens WL4 according Example 4 of the present invention. In Example 4, a front lens group GF is composed of a first front lens group GF1 that is composed of a negative meniscus lens L41 having a concave surface (second surface) facing an image side, a second front lens group GF2 that is composed of a negative meniscus lens (negative lens) L42 having a concave surface (fourth surface) facing the image side, and a third front lens group GF3 that is composed of a double convex lens L43 having a convex surface (sixth surface) facing an object side. A rear lens group GB is composed of a first rear lens group GB1 that is composed of a cemented lens constructed by a double concave lens (negative lens) L44 cemented with a double convex lens (positive lens) L45, and a second rear lens group GB2 that is composed of a plano-convex lens (positive lens) L46. An aperture stop S4 is disposed between the front lens group GF and the rear lens group GB, and in addition to this, and a fixed stop FS4 is disposed between the second front lens group GF2 and the third front lens group GF3.

Various values associated with each lens according to Example 4 are listed in Table 4. In Table 4, respective surface numbers 1 through 13 relate to the wide-angle lens WL4 according to Example 4 and correspond to reference numbers 1 through 13 shown in FIG. 11.

TABLE 4

[Specifications]

| | |
|---|---|
| f = | 10 |
| f1 = | −29.09093 |
| f2 = | −33.18054 |
| f3 = | 25.37716 |
| f12 = | −12.08375 |
| f6 = | 44.33998 |
| FNo = | 2 |
| 2ω = | 148° |
| Ymax = | 12.4652 |

[Lens Data]

| i | r | d | ν | nd | |
|---|---|---|---|---|---|
| 1 | 62.26376 | 5.26332 | 49.599 | 1.7724990 | L41 |
| 2 | 15.90444 | 14.91274 | | | |
| 3 | 63.02606 | 4.38610 | 64.119 | 1.5168000 | L42 |
| 4 | 13.16049 | 5.87737 | | | |
| 5 | ∞ | 0.92108 | Fixed Stop | | FS4 |
| 6 | 39.16568 | 15.13204 | 23.778 | 1.8466600 | L43 |
| 7 | −39.16568 | 0.43861 | | | |
| 8 | ∞ | 3.07027 | Aperture Stop S4 | | |
| 9 | −99.87062 | 4.38610 | 18.897 | 1.9228600 | L44 |
| 10 | 14.74168 | 13.72849 | 49.599 | 1.7724990 | L45 |
| 11 | −27.63638 | 0.87722 | | | |
| 12 | 35.64934 | 8.77220 | 46.571 | 1.8040000 | L46 |
| 13 | ∞ | 20.91381 | | | |

[Values for Conditional Expressions]

(1) f2/f1 = 0.876
(2) f12/f6 = −0.273
(3) f12/f = −1.208
(4) f6/f = 4.434
(5) f3/f = 2.538
(6) n4/n5 = 1.085
(7) ν5/ν4 = 2.625

Figure 12:
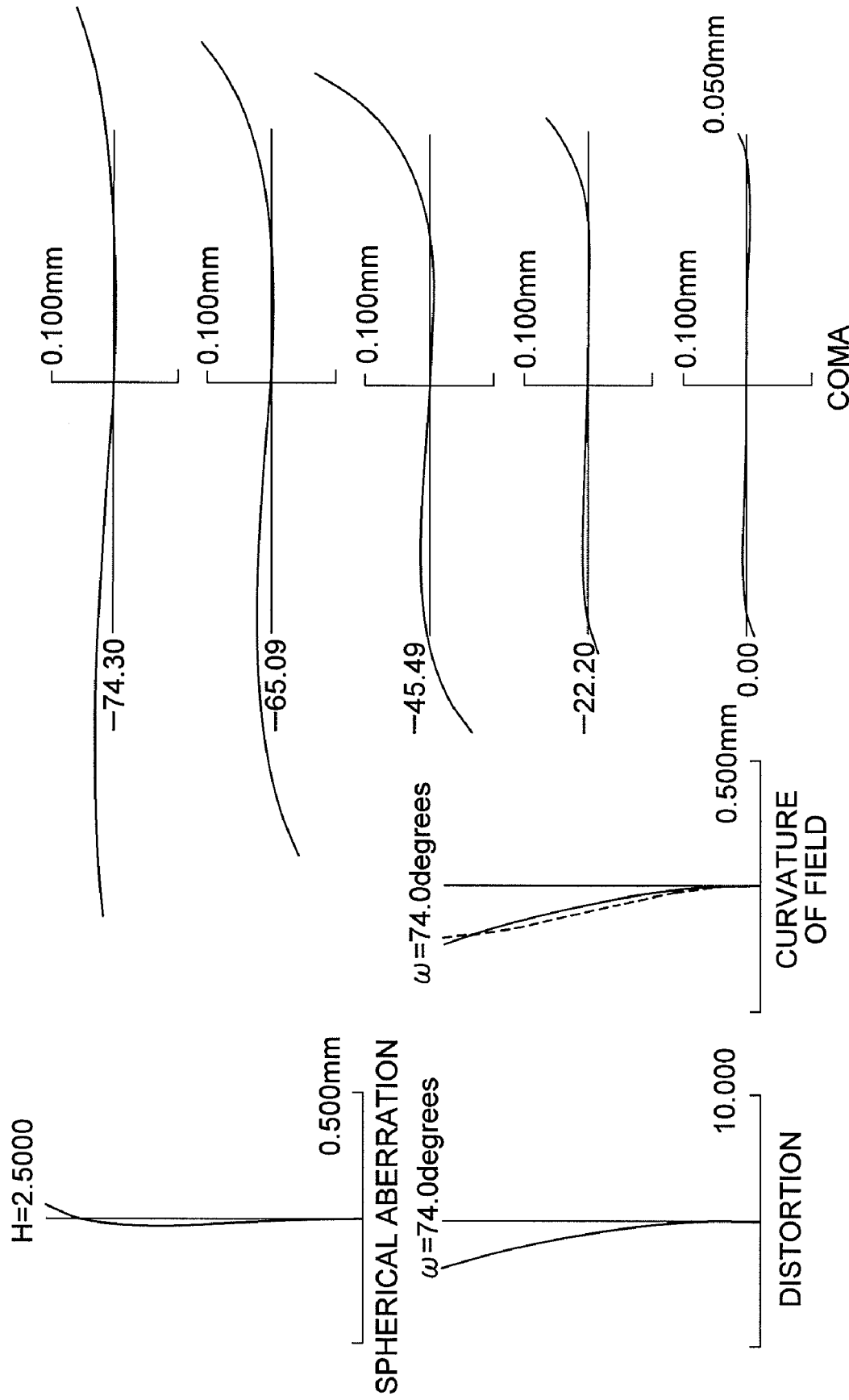
FIG. 12 shows various aberrations of the wide-angle lens according to Example 4.

As shown above, conditional expressions (1) through (7) are fully satisfied in Example 4. FIG. 12 shows various aberrations of the wide-angle lens according to Example 4. As is apparent from the respective graphs, the wide-angle lens according to Example 4 shows superb optical performance as a result of good corrections to various aberrations.

Example 5

Figure 13:
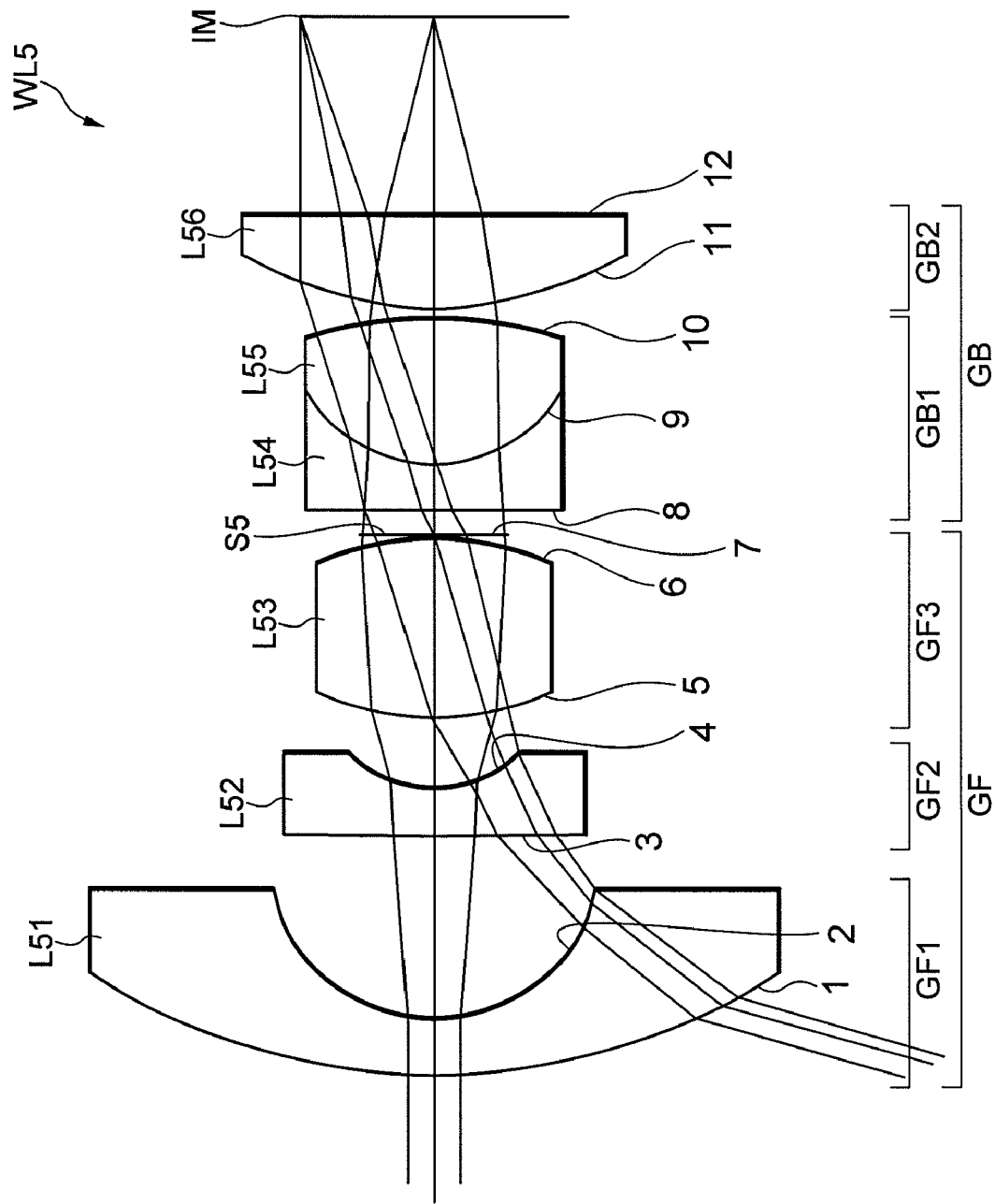
FIG. 13 is a diagram showing a lens configuration of a wide-angle lens according to Example 5 of the present invention.

FIG. 13 is a diagram showing a lens configuration of a wide-angle lens WL5 according Example 5 of the present invention. In Example 5, a front lens group GF is composed of a first front lens group GF1 that is composed of a negative meniscus lens L51 having a concave surface (second surface) facing an image side, a second front lens group GF2 that is composed of a negative meniscus lens (negative lens) L52 having a concave surface (fourth surface) facing the image side, and a third front lens group GF3 that is composed of a double convex lens L53 having a convex surface (fifth surface) facing an object side. A rear lens group GB is composed of a first rear lens group GB1 that is composed of a cemented lens constructed by a plano-concave lens (negative lens) L54 cemented with a double convex lens (positive lens) L55, and a second rear lens group GB2 that is composed of a plano-convex lens (positive lens) L56. An aperture stop S5 is disposed between the front lens group GF and the rear lens group GB.

In Example 5, the image side lens surface (tenth surface) of the double convex lens L55 composing the first rear lens group GB1 is an aspherical surface. When "y" denotes a vertical height from the optical axis of the aspherical surface, S(y) denotes a sag amount which is a distance along the optical axis from the tangent surface at the vertex of the aspherical surface to the aspherical surface at the vertical height y from the optical axis, r denotes a radius of curvature of a reference sphere (radius of curvature of the vertex), k denotes a conical coefficient, and Cn denotes an aspherical coefficient of n-th order, the aspherical surface is exhibited by the following expression (9), and a paraxial radius of curvature R is exhibited by the following expression (10):

$$S(y)=(y^2/r)/\{1+(1-k\times y^2/r^2)^{1/2}\}+C2\times y^2+C4\times y^4+C6\times y^6+C8\times y^8+C10\times y^{10}+ \quad (9)$$

$$R=1/(1/r+2C2) \quad (10)$$

Various values associated with each lens according to Example 5 are listed in Table 5. In Table 5, respective surface numbers 1 through 12 relate to the wide-angle lens WL5 according to Example 5 and correspond to reference numbers 1 through 12 shown in FIG. 13. In the following Examples, a lens surface on which an aspherical surface is formed is attached "*" to the right side of the surface number.

TABLE 5

[Specifications]

| | |
|---|---|
| f = | 10 |
| f1 = | −31.64823 |
| f2 = | −23.45118 |
| f3 = | 20.65386 |
| f12 = | −10.07219 |
| f6 = | 43.25192 |
| FNo = | 2 |
| 2ω = | 150° |
| Ymax = | 12.48 |

[Lens Data]

| i | r | d | ν | nd | |
|---|---|---|---|---|---|
| 1 | 58.87350 | 5.17346 | 53.868 | 1.7003940 | L51 |
| 2 | 15.52039 | 16.81376 | | | |
| 3 | 627.27880 | 4.31122 | 64.140 | 1.5083850 | L52 |
| 4 | 11.67276 | 6.46683 | | | |
| 5 | 28.05962 | 16.38264 | 25.426 | 1.7788280 | L53 |
| 6 | −28.05962 | 0.43112 | | | |
| 7 | ∞ | 2.15561 | Aperture Stop S5 | | |
| 8 | ∞ | 4.31122 | 25.426 | 1.7788280 | L54 |
| 9 | 14.00909 | 13.36478 | 60.077 | 1.6295190 | L55 |
| 10* | −37.86187 | 0.86224 | | | |
| 11 | 34.08571 | 8.62244 | 46.571 | 1.7880740 | L56 |
| 12 | ∞ | 18.10719 | | | |

[Aspherical Surface Data]

| | |
|---|---|
| Surface Number = | 10 |
| κ = | 1.0000 |
| C2 = | 0.00000 |
| C4 = | 5.50000 × 10⁻⁶ |
| C6 = | 0.00000 |
| C8 = | 0.00000 |
| C10 = | 0.00000 |

TABLE 5-continued

[Values for Conditional Expressions]

(1) f2/f1 = 0.741
(2) f12/f6 = −0.233
(3) f12/f = −1.007
(4) f6/f = 4.325
(5) f3/f = 2.065
(6) n4/n5 = 1.092
(7) ν5/ν4 = 2.363

Figure 14:
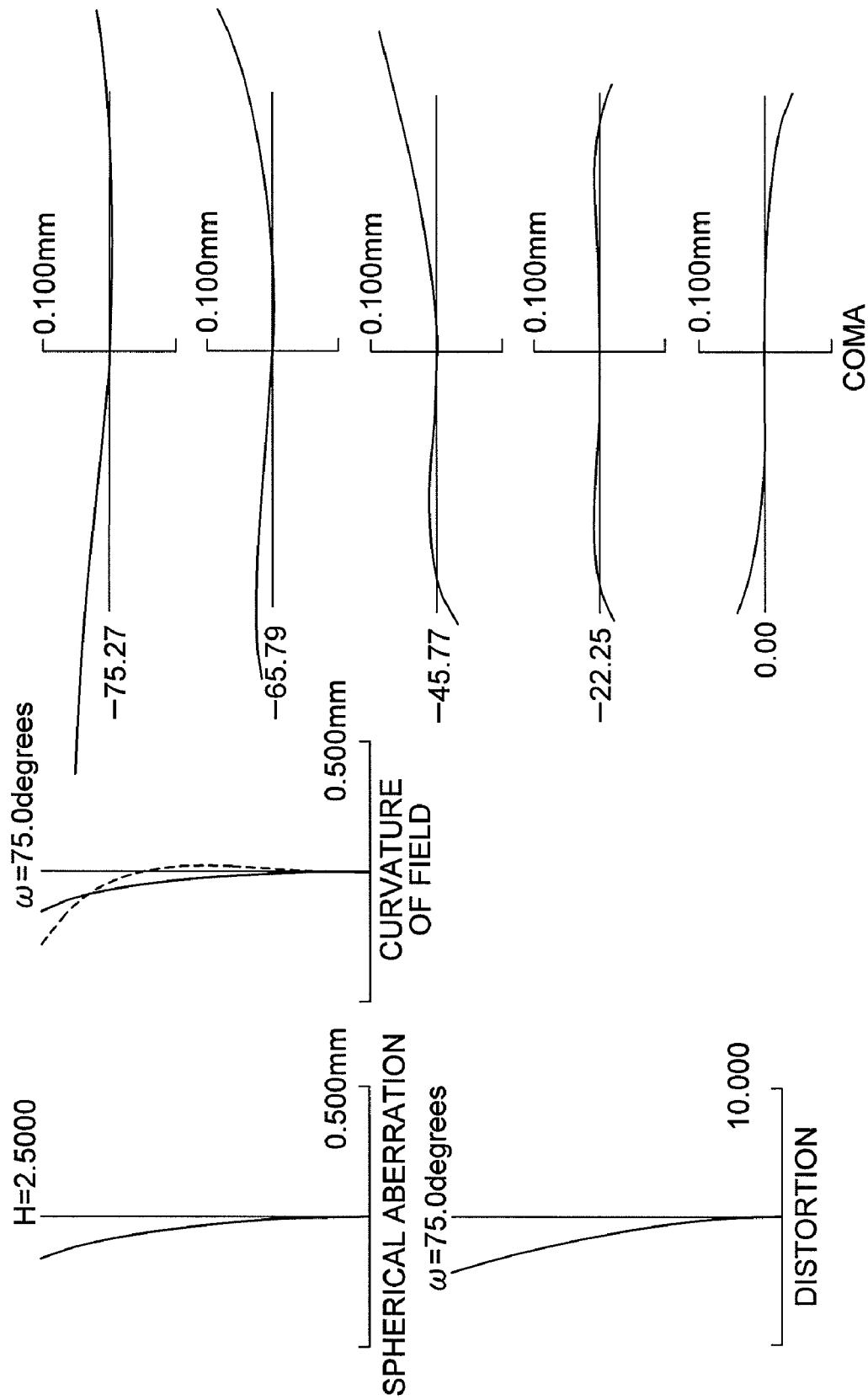
FIG. 14 shows various aberrations of the wide-angle lens according to Example 5.

As shown above, conditional expressions (1) through (7) are fully satisfied in Example 5. FIG. 14 shows various aberrations of the wide-angle lens according to Example 5. As is apparent from the respective graphs, the wide-angle lens according to Example 5 shows superb optical performance as a result of good corrections to various aberrations.

Example 6

Figure 15:
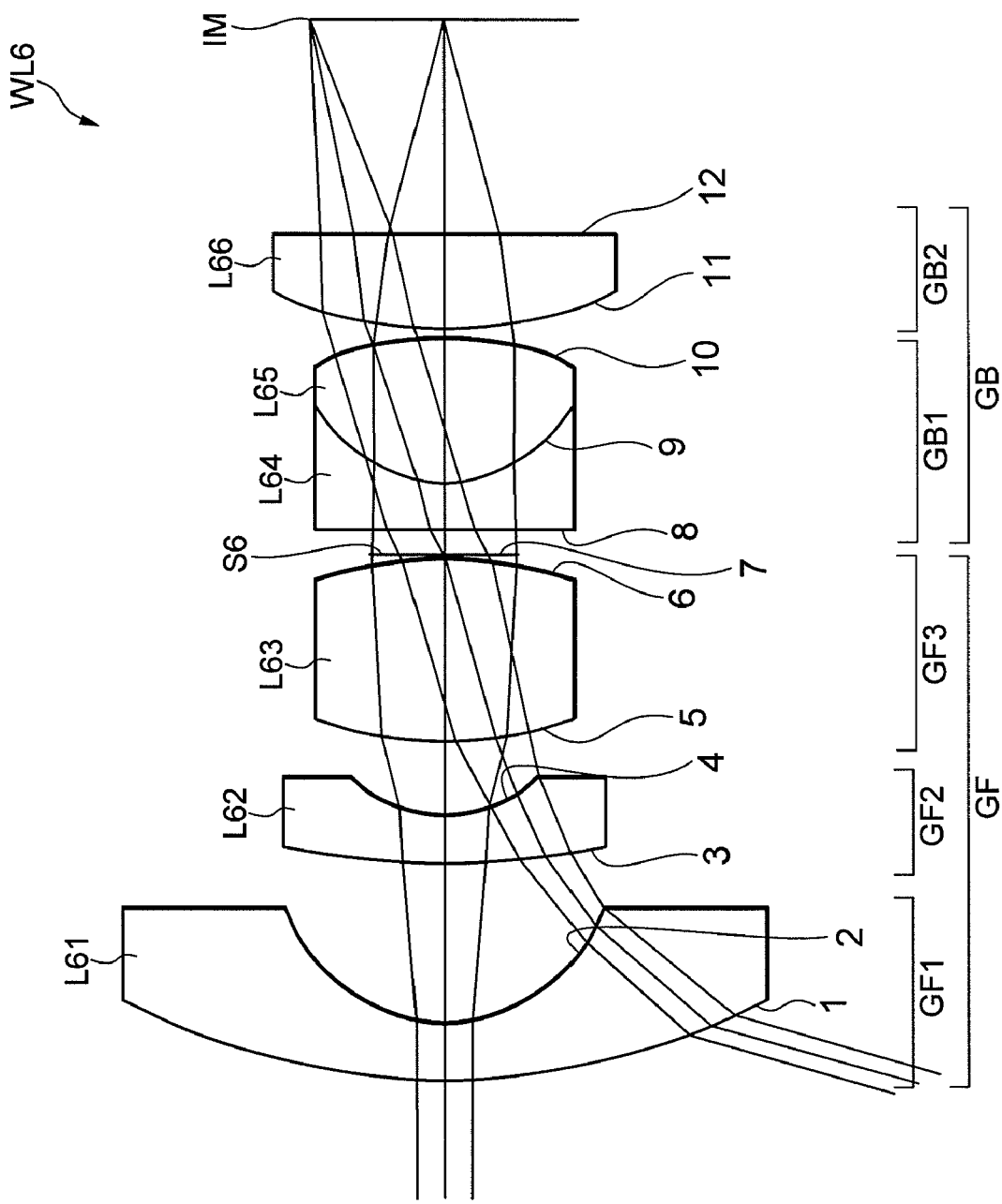
FIG. 15 is a diagram showing a lens configuration of a wide-angle lens according to Example 6 of the present invention.

FIG. 15 is a diagram showing a lens configuration of a wide-angle lens WL6 according Example 6 of the present invention. In Example 6, a front lens group GF is composed of a first front lens group GF1 that is composed of a negative meniscus lens L61 having a concave surface (second surface) facing an image side, a second front lens group GF2 that is composed of a negative meniscus lens (negative lens) L62 having a concave surface (fourth surface) facing the image side, and a third front lens group GF3 that is composed of a double convex lens L63 having a convex surface (fifth surface) facing an object side. A rear lens group GB is composed of a first rear lens group GB1 that is composed of a cemented lens constructed by a plano-concave lens (negative lens) L64 cemented with a double convex lens (positive lens) L65, and a second rear lens group GB2 that is composed of a plano-convex lens (positive lens) L66. An aperture stop S6 is disposed between the front lens group GF and the rear lens group GB.

Various values associated with each lens according to Example 6 are listed in Table 6. In Table 6, respective surface numbers 1 through 12 relate to the wide-angle lens WL6 according to Example 6 and correspond to reference numbers 1 through 12 shown in FIG. 15.

TABLE 6

[Specifications]

| | |
|---|---|
| f = | 10 |
| f1 = | −27.72580 |
| f2 = | −31.12291 |
| f3 = | 24.81446 |
| f12 = | −11.31402 |
| f6 = | 50.33504 |
| FNo = | 2 |
| 2ω = | 150° |
| Ymax = | 12.480 |

[Lens Data]

| i | r | d | ν | nd | |
|---|---|---|---|---|---|
| 1 | 63.29116 | 5.21748 | 46.571 | 1.7880740 | L61 |
| 2 | 15.65243 | 14.89999 | | | |
| 3 | 78.71576 | 4.34790 | 64.140 | 1.5083850 | L62 |
| 4 | 12.92904 | 6.86592 | | | |
| 5 | 36.33690 | 16.81893 | 23.778 | 1.8172260 | L63 |
| 6 | −36.33690 | 0.43479 | | | |
| 7 | ∞ | 2.17395 | Aperture Stop S6 | | |
| 8 | ∞ | 4.34790 | 23.778 | 1.8172260 | L64 |
| 9 | 13.60496 | 13.41992 | 55.535 | 1.6847340 | L65 |
| 10 | −30.06466 | 0.86958 | | | |

TABLE 6-continued

| 11 | 39.66773 | 8.69579 | 46.571 | 1.7880740 | L66 |
|---|---|---|---|---|---|
| 12 | ∞ | 19.73552 | | | |

[Values for Conditional Expressions]

(1) f2/f1 = 1.123
(2) f12/f6 = −0.225
(3) f12/f = −1.131
(4) f6/f = 5.033
(5) f3/f = 2.481
(6) n4/n5 = 1.079
(7) ν5/ν4 = 2.336

Figure 16:
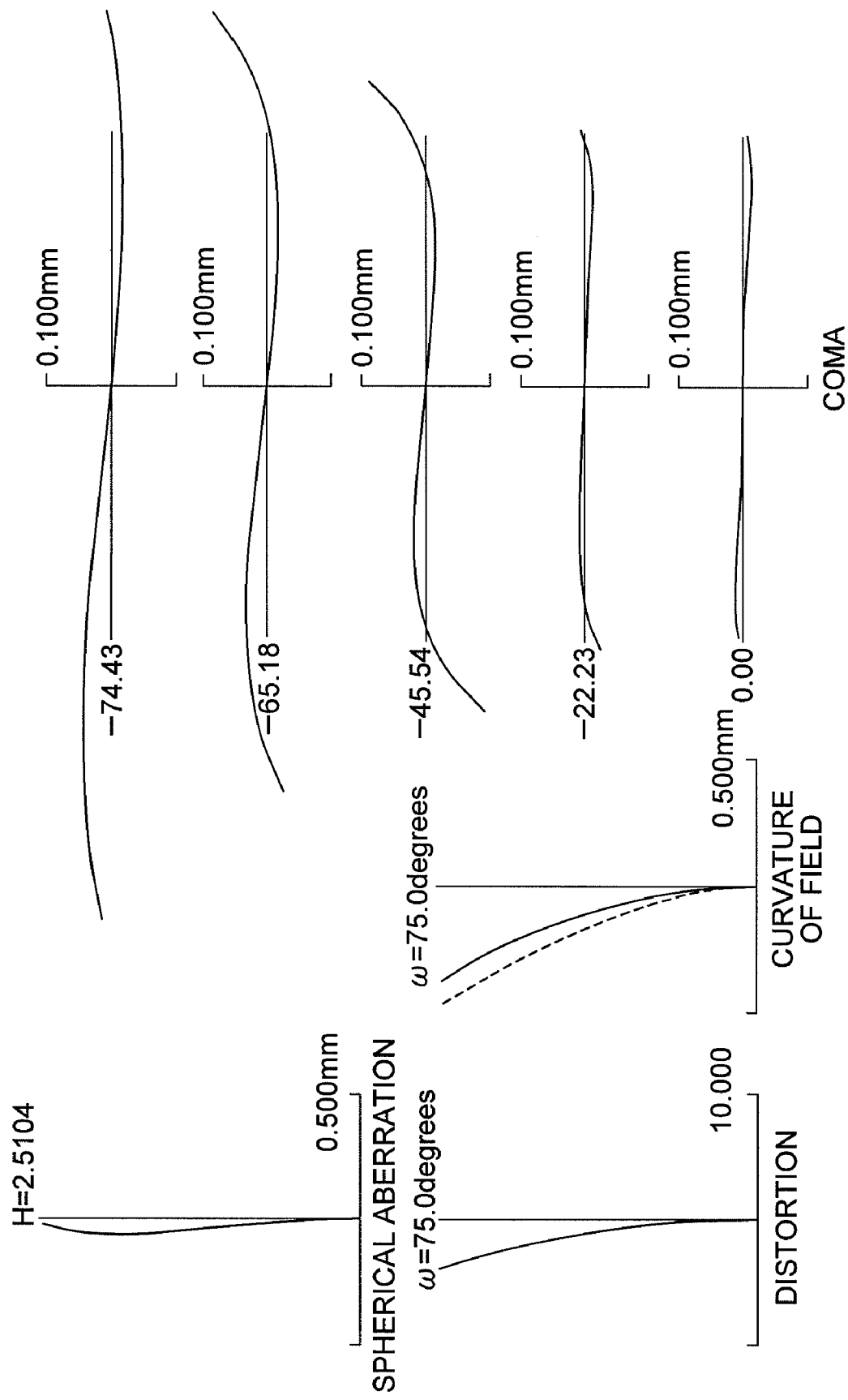
FIG. 16 shows various aberrations of the wide-angle lens according to Example 6.

As shown above, conditional expressions (1) through (7) are fully satisfied in Example 6. FIG. 16 shows various aberrations of the wide-angle lens according to Example 6. As is apparent from the respective graphs, the wide-angle lens according to Example 6 shows superb optical performance as a result of good corrections to various aberrations.

Example 7

Figure 17:
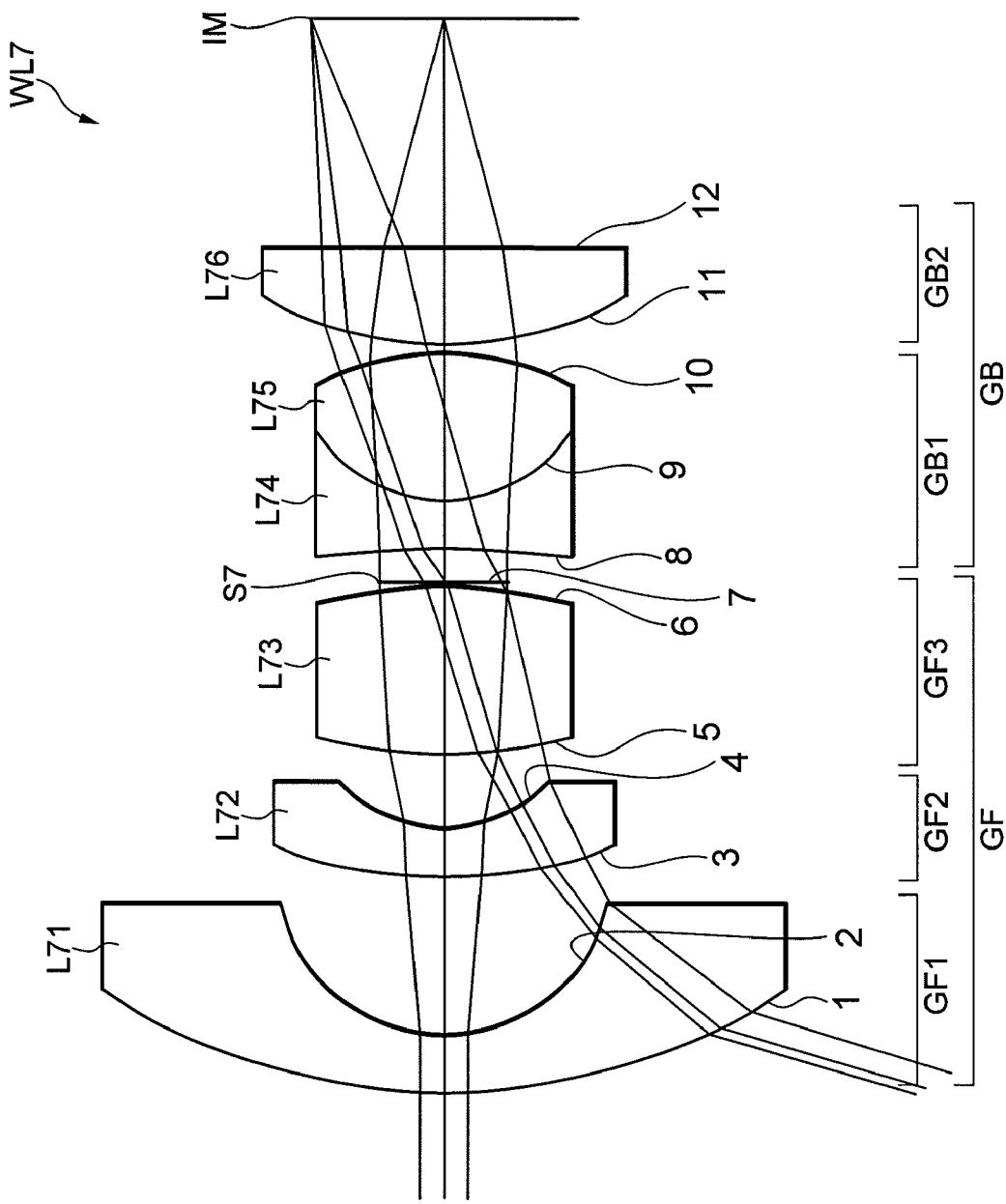
FIG. 17 is a diagram showing a lens configuration of a wide-angle lens according to Example 7 of the present invention.

FIG. 17 is a diagram showing a lens configuration of a wide-angle lens WL7 according Example 7 of the present invention. In Example 7, a front lens group GF is composed of a first front lens group GF1 that is composed of a negative meniscus lens L71 having a concave surface (second surface) facing an image side, a second front lens group GF2 that is composed of a negative meniscus lens (negative lens) L72 having a concave surface (fourth surface) facing the image side, and a third front lens group GF3 that is composed of a double convex lens L73 having a convex surface (fifth surface) facing an object side. A rear lens group GB is composed of a first rear lens group GB1 that is composed of a cemented lens constructed by a double concave lens (negative lens) L74 cemented with a double convex lens (positive lens) L75, and a second rear lens group GB2 that is composed of a plano-convex lens (positive lens) L76. An aperture stop S7 is disposed between the front lens group GF and the rear lens group GB.

Various values associated with each lens according to Example 7 are listed in Table 7. In Table 7, respective surface numbers 1 through 12 relate to the wide-angle lens WL7 according to Example 7 and correspond to reference numbers 1 through 12 shown in FIG. 17.

TABLE 7

[Specifications]

| | |
|---|---|
| f = | 10 |
| f1 = | −28.58207 |
| f2 = | −39.85925 |
| f3 = | 27.74794 |
| f12 = | −13.21773 |
| f6 = | 42.59732 |
| FNo = | 2 |
| 2ω = | 149° |
| Ymax = | 12.480 |

[Lens Data]

| i | r | d | ν | nd | |
|---|---|---|---|---|---|
| 1 | 58.18103 | 5.26949 | 46.571 | 1.7880740 | L71 |
| 2 | 15.80846 | 14.57226 | | | |
| 3 | 46.01637 | 4.39124 | 64.140 | 1.5083850 | L72 |
| 4 | 13.75841 | 6.80642 | | | |
| 5 | 47.16319 | 15.54853 | 18.897 | 1.8836720 | L73 |
| 6 | −47.16319 | 0.43912 | | | |
| 7 | ∞ | 3.07387 | Aperture Stop S7 | | |

TABLE 7-continued

| 8 | −74.63330 | 4.39124 | 18.897 | 1.8836720 | L74 |
|---|---|---|---|---|---|
| 9 | 14.05702 | 13.54532 | 46.571 | 1.7880740 | L75 |
| 10 | −27.19315 | 0.87825 | | | |
| 11 | 34.24825 | 8.78248 | 46.571 | 1.7880740 | L76 |
| 12 | ∞ | 21.02102 | | | |

[Values for Conditional Expressions]

(1) f2/f1 = 1.389
(2) f12/f6 = −0.311
(3) f12/f = −1.336
(4) f6/f = 4.303
(5) f3/f = 2.864
(6) n4/n5 = 1.053
(7) v5/v4 = 2.465

Figure 18:
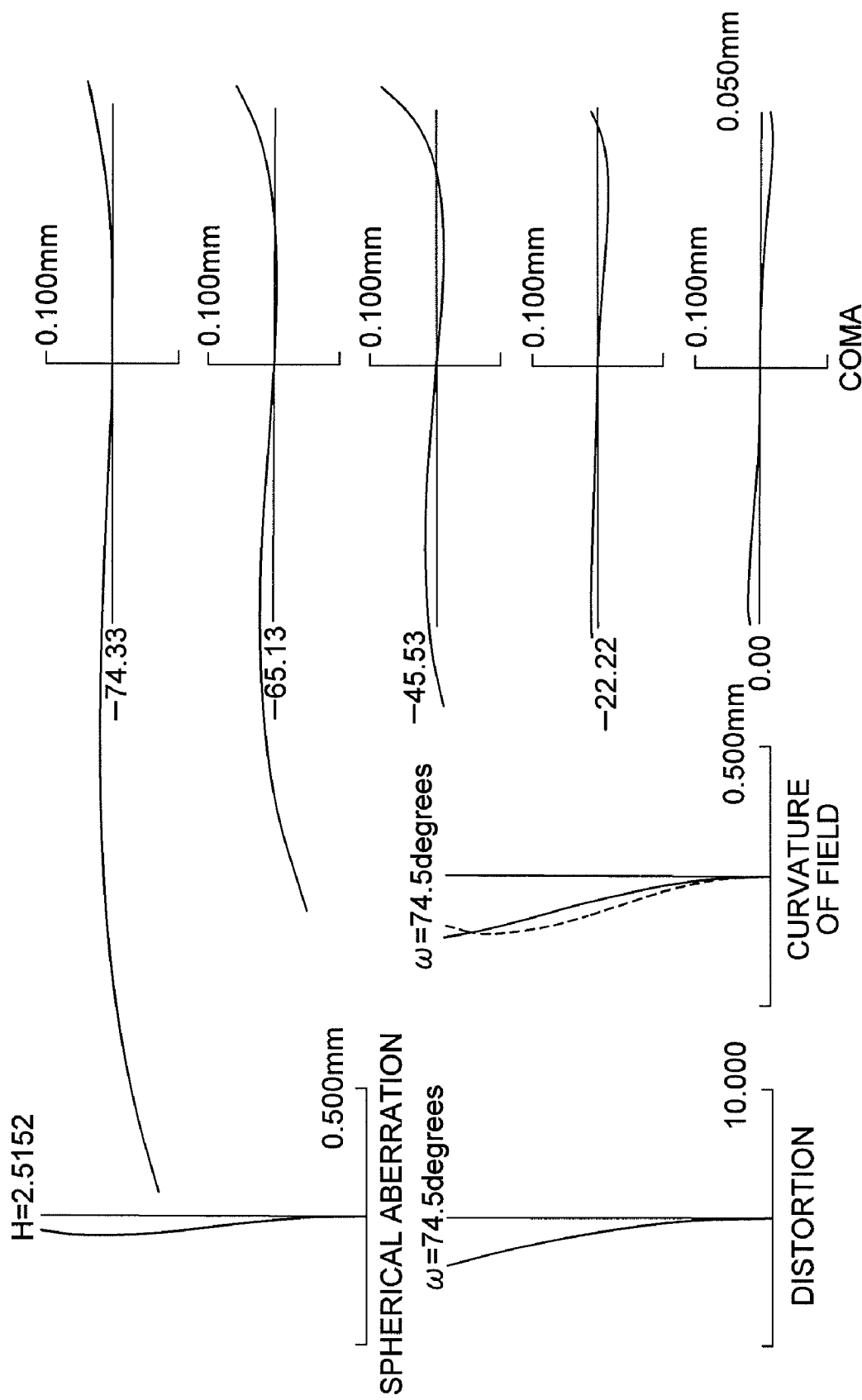
FIG. 18 shows various aberrations of the wide-angle lens according to Example 7.

As shown above, conditional expressions (1) through (7) are fully satisfied in Example 7. FIG. 18 shows various aberrations of the wide-angle lens according to Example 7. As is apparent from the respective graphs, the wide-angle lens according to Example 7 shows superb optical performance as a result of good corrections to various aberrations.

What is claimed is:

1. A wide-angle lens consisting of, in order from an object side:
   a front lens group consisting of a first front lens group that consists of a negative meniscus lens having a concave surface facing an image side, a second front lens group that consists of a negative lens having a concave surface facing the image side, and a third front lens group that has a convex surface facing the object side and has positive refractive power; and
   a rear lens group consisting of a first rear lens group that consists of a cemented lens constructed by, in order from the object side, a negative lens cemented with a positive lens and has positive refractive power as a whole, and a second rear lens group having positive refractive power; and
   the following conditional expressions being satisfied:

$0.741 \leq f2/f1 < 1.95$ $-0.36 < f12/f6 < -0.21$ $-1.38 < f12/f < -0.95$ $3.50 < f6/f < 5.20$ where f denotes a focal length of the wide-angle lens, f1 denotes a focal length of the first front lens group, f2 denotes a focal length of the second front lens group, f12 denotes a combined focal length of the first front lens group and the second front lens group, and f6 denotes a focal length of the second rear lens group.

2. The wide-angle lens according to claim 1, wherein the following conditional expression is satisfied:

$2.00 < f3/f < 3.59$ where f3 denotes a focal length of the third front lens group.

3. The wide-angle lens according to claim 1, wherein the following conditional expression is satisfied:

$1.05 < n4/n5 < 1.15$ where n4 denotes a refractive index of the negative lens composing the first rear lens group at a reference wavelength, and n5 denotes a refractive index of the positive lens composing the first rear lens group at a reference wavelength.

4. The wide-angle lens according to claim 1, wherein the following conditional expression is satisfied:

$2.30 < v5/v4 < 3.05$ where v4 denotes an Abbe number of the negative lens composing the first rear lens group, and v5 denotes an Abbe number of the positive lens composing the first rear lens group.

5. The wide-angle lens according to claim 1, wherein an optical element is disposed at least one of a space between the object and the lens, and a space between the last lens surface and an imaging surface.

6. An imaging apparatus comprising:
   an imaging optical system including the wide-angle lens according to claim 1;
   an imaging portion that detects an image of the object formed by the imaging optical system and converts into electric signal; and
   an image processor that processes the electric signal output from the imaging portion and outputs an image of the object.

7. The imaging apparatus according to claim 6, wherein the image processor is constructed such that the image processor corrects distortion of the image detected by the imaging portion caused by the imaging optical system and outputs a corrected image.

8. The imaging apparatus according to claim 6, wherein the image processor is constructed such that the image processor corrects lateral chromatic aberration of the image detected by the imaging portion caused by the imaging optical system and outputs a corrected image.

9. The imaging apparatus according to claim 6, further comprising:
   an image memory that stores the image output from the image processor;
   wherein the image memory stores in addition to the image at least one of the time the image was shot, the shooting direction of the image, the coordinates of the position where the image was shot, distance information of the object, and the model of the imaging apparatus.

10. The imaging apparatus according to claim 6, wherein the image processor obtains distance information of at least a designated place by using parallax on the basis of an electric signal of the image acquired from the imaging portion and the imaging optical system and an electric signal of the image acquired from another imaging apparatus.

* * * * *